US011245550B2

(12) United States Patent
Biham et al.

(10) Patent No.: US 11,245,550 B2
(45) Date of Patent: Feb. 8, 2022

(54) MESSAGE AUTHENTICATION BASED ON A PHYSICAL LOCATION ON A BUS

(71) Applicant: Technion Research & Development Foundation Limited, Haifa (IL)

(72) Inventors: Eli Biham, Nesher (IL); Eli Gavril, Kiryat-Motzkin (IL); Sara Bitan-Erlich, Moshav Hadar-Am (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 16/956,625

(22) PCT Filed: Dec. 18, 2018

(86) PCT No.: PCT/IL2018/051372
§ 371 (c)(1),
(2) Date: Jun. 22, 2020

(87) PCT Pub. No.: WO2019/123458
PCT Pub. Date: Jun. 27, 2019

(65) Prior Publication Data
US 2020/0403825 A1     Dec. 24, 2020

Related U.S. Application Data

(60) Provisional application No. 62/610,206, filed on Dec. 24, 2017.

(51) Int. Cl.
*H04L 12/46* (2006.01)
*H04L 9/32* (2006.01)
(Continued)

(52) U.S. Cl.
CPC ........ *H04L 12/4625* (2013.01); *H04L 9/3242* (2013.01); *H04L 12/40013* (2013.01);
(Continued)

(58) Field of Classification Search
CPC ........... H04L 12/4625; H04L 12/40013; H04L 12/4604; H04L 12/46; H04L 12/40006;
(Continued)

(56) References Cited

U.S. PATENT DOCUMENTS 5,434,861 A    7/1995 Pritty et al.
5,948,089 A *  9/1999 Wingard ................. G06F 13/37
                                             710/107
(Continued)

FOREIGN PATENT DOCUMENTS

CN        102848990       1/2013
WO    WO 2011/051157    5/2011
WO    WO 2019/123458    6/2019

OTHER PUBLICATIONS

International Preliminary Report on Patentability dated Jul. 9, 2020 From the International Bureau of WIPO Re. Application No. PCT/IL2018/051372. (7 Pages).
(Continued)

*Primary Examiner* — Jenee Holland

(57) ABSTRACT

A system for authenticating messages transmitted on a bus based on physical location of transmitting units, comprising a reflector adapted to inject a plurality of reflection signals at a first point of a line topology bus, each in response to each of a plurality of messages transmitted by a plurality of bus connected units and a probe adapted to intercept the messages and the reflection signals at a second point of the bus. The probe calculates propagation timing between a reception time of the message and a reception time of an associated reflection signal transmitted in response to the message and determines validity of the message according to a match between the calculated propagation timing and a predefined propagation timings associated with the bus connected units. Wherein the bus connected units are stati-
(Continued)

cally connected to the bus between the first point and the second point.

18 Claims, 10 Drawing Sheets

(51) Int. Cl.
      *H04L 12/40*       (2006.01)
      *H04L 12/26*       (2006.01)
      *H04L 29/06*       (2006.01)

(52) U.S. Cl.
      CPC .............. *H04L 43/12* (2013.01); *H04L 43/16* (2013.01); *H04L 69/28* (2013.01)

(58) Field of Classification Search
      CPC ..... H04L 9/3242; H04L 9/3236; H04L 43/12; H04L 43/16; H04L 69/28
      See application file for complete search history.

(56) References Cited

U.S. PATENT DOCUMENTS

| | | | |
|---|---|---|---|
| 6,122,257 A | 9/2000 | Machida et al. | |
| 6,259,694 B1* | 7/2001 | Sato | H04J 3/0685 348/425.1 |
| 6,801,942 B1* | 10/2004 | Dietrich | H04L 12/4625 709/217 |
| 9,616,828 B2* | 4/2017 | Ben Noon | B60R 16/023 |
| 9,705,697 B1* | 7/2017 | Tomita | H04L 25/4902 |
| 2001/0001151 A1* | 5/2001 | Duckwall | H04L 29/1232 710/8 |
| 2002/0083246 A1* | 6/2002 | Rupp | H04L 12/403 710/107 |
| 2003/0112805 A1* | 6/2003 | Stanton | H04L 12/4625 370/395.1 |
| 2003/0188165 A1* | 10/2003 | Sutton, II | H04L 9/32 713/176 |
| 2004/0057450 A1* | 3/2004 | Okuyama | H04L 67/325 370/447 |
| 2004/0098514 A1* | 5/2004 | Schuster | H04L 12/40169 709/253 |
| 2004/0139260 A1* | 7/2004 | Steinmetz | H04L 45/60 710/269 |
| 2005/0060547 A1* | 3/2005 | Saito | H04L 12/40104 713/171 |
| 2005/0251601 A1* | 11/2005 | Duckwall | H04L 29/12867 710/100 |
| 2006/0174042 A1* | 8/2006 | Weigl | H04L 12/40 710/100 |
| 2007/0168661 A1* | 7/2007 | Chaney | H04N 21/43615 713/168 |
| 2007/0245042 A1* | 10/2007 | Lammers | H04L 12/4135 710/31 |
| 2009/0319709 A1* | 12/2009 | Vallius | H04L 12/4135 710/118 |
| 2012/0071990 A1* | 3/2012 | Asano | H04L 12/40006 700/11 |
| 2015/0033016 A1 | 1/2015 | Thornton et al. | |
| 2016/0056906 A1* | 2/2016 | Lassini | H04J 3/1694 370/442 |
| 2016/0197944 A1 | 7/2016 | Allouche et al. | |
| 2017/0111183 A1* | 4/2017 | Kojima | H04L 12/40006 |

OTHER PUBLICATIONS

International Search Report and the Written Opinion dated Apr. 7, 2019 From the International Searching Authority Re. Application No. PCT/IL2018/051372. (10 Pages).
Bosch "CAN Specification Version 2.0", Robert Bosch GmbH, User Manual, p. 1-72, Sep. 1991.
Checkoway et al. "Comprehensive Experimental Analyses of Automative Attack Surfaces", Proceedings of the 20th USENIX Conference on Security, SEC'11, San Francisco, CA, USA, Aug. 8-12, 2011, 16 P., Aug. 8, 2011.
Corrigan "Critical Spacing of CAN Bus Connections", Texas Instruments, Application Report, SLLA279A, p. 1-9, Nov. 2008, Revised Jan. 2009.
Dagan et al. "Parrot, A Software-Only Anti-Spoofing Defense System for the CAN Bus", 14th Embedded Security in Cars, p. 1-10, 2016.
Koscher et al. "Experimental Security Analysis of A Modern Automobile", 2010 IEEE Symposium on Security and Privacy, SP'10, Berkeley/Oakland, CA, USA, May 16-19, 2010, p. 447-462, May 16, 2010.
Kurachi et al. "CaCAN—Centralized Authentication System in CAN (Controler Area Network)", 14th International Conference on Embedded Security in Cars, ESCAR 2014, p. 1-24, 2014.
Miller et al. "Remote Exploitation of An Unaltered Passenger Vehicle", Black Hat USA, p. 1-91, Aug. 10, 2015.
Perrig et al. "Efficient Authentication and Signing of Multicast Streams Over Lossy Channels", Proceedings of the 2000 IEEE Symposium on Security and Privacy, SP'00, Berkeley, CA, USA, May 14-17, 2000, p. 56-73, May 14, 2000.
Ujiie et al. "A Method for Disabling Malicious CAN Messages by Using A Centralized Monotoring and Interceptor ECU", 13th International Conference on Embedded Security in Cars, ESCAR 2015, p. 1-10, 2015.
Van Herrewege et al. "CANAuth—A Simple, Backward Compatible Broadcast Authentication Protocol for CAN Bus", ECRYPT Workshop on Lightweight Cryptography, 2011: 1-7, Jan. 1, 2011.
Ziermann et al. "Can+: A New Backward-Compatible Controller Area Network (CAN) Protocol With Up to 16x Higher Data Rates", Design, Automation & Test in Europe Conference & Exhibition, DATE'09, Nice, France, Apr. 20-24, 2009, p. 1088-1093, Apr. 20, 2009.
Supplementary European Search Report and the European Search Opinion dated Jul. 19, 2021 From the European Patent Office Re. Application No. 188928908.7. (11 Pages).

* cited by examiner

MESSAGE AUTHENTICATION BASED ON A PHYSICAL LOCATION ON A BUS

RELATED APPLICATIONS

This application is a National Phase of PCT Patent Application No. PCT/IL2018/051372 having International filing date of Dec. 18, 2018, which claims the benefit of priority under 35 USC § 119(e) of U.S. Provisional Patent Application No. 62/610,206 filed on Dec. 24, 2017. The contents of the above applications are all incorporated by reference as if fully set forth herein in their entirety.

BACKGROUND

The present invention, in some embodiments thereof, relates to authenticating an origin of messages transmitted on a bus, and, more specifically, but not exclusively, to authenticating the origin of messages transmitted on a bus based on verification of message prorogation timing indicative of a location of the message originating unit on the bus.

With the ever evolving connectivity and functionality of devices, systems, infrastructures and/or the like, cyber-attacks and cyber threats may present a major and ever growing security concern for multiple networks, systems and infrastructures. Potential malicious attackers may penetrate a network either by connecting to the network and/or by taking over one or more devices connected to the network and intercept and/or inject malicious data to the network. Such potential attackers may include either human users and/or automated tools, for example, malware applications, agents, scripts and/or the like.

One of the major methods to detect, prevent and/or circumvent such cyber threats is message authentication in which the origin of a message is authenticated as the valid legitimate member of the network as opposed to a potential attacker and/or a compromised member of the network.

SUMMARY

According to a first aspect of the present invention there is provided a system for authenticating messages transmitted on a bus based on physical location of transmitting units, comprising:
  A reflector adapted to inject a plurality of reflection signals at a first point of a line topology bus. Each of the reflection signals is injected in response to a respective one of a plurality of messages transmitted by a plurality of bus connected units.
  A probe adapted to intercept the plurality of messages and the plurality of reflection signals at a second point of the bus. The probe having one or more processors adapted to:
  Calculate a propagation timing between a reception time of each message and a reception time of an associated one of the plurality of reflection signals transmitted in response to the message.
  Determine validity of each message according to a match between the calculated propagation timing and each of a plurality of predefined propagation timings associated with the plurality of bus connected units.
  Wherein the plurality of bus connected units are statically connected to the bus between the first point and the second point.

By authenticating the message origin based on physical location of bus units which are approved in the bus deployment, the messages transmitted on the bus may be easily authenticated with minimal overhead. In addition, the location based authentication may significantly reduce complexity of the bus units which may be relived of supporting cryptographic abilities which are typically extensive. This may further allow connection of legacy bus units to bus deployments incorporating the probe and reflector for the message origin location based authentication. Moreover, the bus bandwidth utilization (traffic) may be maintained as in normal bus operation (i.e. with no message authentication) since the reflection signals may impose only an insignificant increase to the traffic on the bus. This is opposed to other authentication methods, for example, the cryptography based methods which may significantly increase the bus traffic for delivery of encrypted messages and/or cryptographic data required to maintain the cryptography based protocol.

According to a second aspect of the present invention there is provided a computer implemented method of authenticating messages transmitted on a network based on physical location of transmitting units, comprising one or more processors of a probe connected at a second point of a line topology bus, the processor(s) is adapted to:
  Intercept a plurality of messages transmitted by a plurality of bus connected units and a plurality of reflection signals injected by a reflector at a first point of the bus. Each of the plurality of reflection signals is injected in response to one of the plurality of messages.
  Calculate a propagation timing between a reception time of each of the plurality of messages and a reception time of an associated one of the plurality of reflection signals transmitted in response to each message.
  Determine validity of each message according to a match between the calculated propagation timing and each of a plurality of predefined propagation timings associated with the plurality of bus connected units.
  Wherein the plurality of bus connected units are statically connected to the bus between the first point and the second point.

In a further implementation form of the first and/or second aspects, the calculated propagation timing is indicative of a physical location on the bus of an originating unit of the plurality of bus connected units which transmitted each message. Since the propagation time may be translated to the distance the message travelled, the exact physical location of the originating bus unit may be calculated. As such only messages correlated with approved bus unit located at predefined physical locations may be authenticated. Messages for which the propagation timing is not predefined may be determined as invalid and potentially malicious as they may be transmitted by bus unit(s) connected to the bus illegally (with no authorization).

In a further implementation form of the first and/or second aspects, for each message, in case of a match, the probe determines the message is valid and takes no further action, and in case of no match, the probe determines the message is invalid and invalidates the message by instructing the plurality of bus connected units to discard the message. Since most messages are likely to be valid, applying no action in case of an authenticated message may inflict no additional overhead. Only in case of detected invalid message an active action is taken to verify that the legitimate bus units ignore the invalid message to prevent malicious operation against the legitimate bus units.

In a further implementation form of the first and/or second aspects, the associated reflection signal comprises identification (ID) of each message to form the association. This may allow the probe to efficiently correlate between each message and its associated reflection signal.

In a further implementation form of the first and/or second aspects, for each message, the probe determines the message is invalid in case one or more additional associated reflection signal are received for the message. Additional reflection signal(s) may be may be indicative of forged signals transmitted by one or more malicious bus units (which are not part of the valid deployment) in an attempt to mislead the probe to correlate the forged reflection signals to one or more malicious messages. Such attempt may be directed to matching the calculated propagation timing between the malicious message and the forged reflection signal to a valid predefined propagation timing associated with legitimate bus unit(s).

In a further implementation form of the first and/or second aspects, for each message, the probe determines the message is invalid in case a time duration of the associated reflection signal exceeds a predefined reflection signal length threshold. Extended reflection signal(s) may also be indicative of forged signals transmitted by the malicious bus unit(s) in an attempt to mislead the probe to correlate the forged reflection signals to the malicious message(s) and authenticating them based on a match of the calculated propagation timing between the malicious message and the forged reflection signal to valid predefined propagation timing.

In a further implementation form of the first and/or second aspects, the plurality of reflection signals is functionally transparent to the plurality of bus connected units. By constructing the reflection signals to be transparent to the bus units, the probe and reflector may be easily integrated with deployments comprising legacy bus units since the bus unit may require no alteration, adaptation and/or adjustment to adapt to the location based message authentication deployment.

In a further implementation form of the first and/or second aspects, the plurality of predefined propagation timings is manually set for each of the plurality of bus connected units. This may allow setting a hardcoded valid deployment of the bus comprising only approved bus units. Any message having a propagation timing which is not predefined for the approved bus units may therefore be determined as an invalid message.

In a further implementation form of the first and/or second aspects, the predefined propagation timing is dynamically determined by the probe by computing the plurality of predefined propagation timings during an initialization process in which one or more of the plurality of bus connected units transmits one or more unit authentication messages used by the probe to calculate a respective one of the plurality of predefined propagation timings. This may allow dynamic addition, removal and/or physical location change of one or more of the bus units connected to the bus. The authentication process comprising the authentication messages which are typically cryptographically encrypted may allow authenticating the approved bus units and dynamically predefine their associated propagation timing values.

In a further implementation form of the first and/or second aspects, the reflector and the probe are integrated in a single device having a plurality of bus interfaces, the reflector connects to the bus through a first bus interface of the plurality of bus interfaces and the probe connects to the bus through a second interface of the plurality of bus interfaces, wherein the propagation timing is calculated between a reception time of each message at the first bus interface and a reception time of the message at the second bus interface. Some bus deployments, specifically buses in which the two bus ends (the first point and the second point) are in close physical proximity may allow such implementation of a single device integrating the probe and the reflector. This may significantly simplify the deployment and potentially recuse the cost of the integrated device. Moreover, the overhead of the reflection signals, however low and insignificant may be avoided as the single device intercepting each message at both bus ends may calculate internally the propagation timing without the need to transmit the reflection signals.

In a further implementation form of the first and/or second aspects, the bus is divided to a plurality of bus segments, each of the plurality of bus segments having a respective reflector connected to the first point of the bus segment and a respective probe connected to the second point of the bus segment. Segmented buses may be common deployments for a plurality of reasons, for example, security, safety, space limitation, cabling restrictions and/or the like. Supporting such segmented bus deployments with the location based message authentication is therefore highly beneficial.

In an optional implementation form of the first and/or second aspects, the respective probe serves as a bridge between at least two of the plurality of bus segments, the respective probe having a plurality of bus interfaces and connects to each of the at least two bus segments through a dedicated one of the plurality of bus interfaces. Bridging between the bus segments may be required for sharing and transferring data between the bus segments. As the unified probe may connect to multiple bus segments, it may be used as the bridge thus combing the bridge functionality into the probe and significantly reduce bus complexity and/or bridging costs.

In a further implementation form of the first and/or second aspects, the bus implements a Controller Area Network (CAN) protocol for in which each of the plurality of bus connected units is identified through a respective message type of a plurality of message types encapsulated in the each of the plurality of messages, the respective message type is exclusively associated with each bus connected unit such that only the respective bus connected unit is capable of transmitting one or more messages of the respective message type. The CAN bus is commonly used for a plurality of bus deployments and applications, for example, the automotive industry, industrial machinery, defense applications and/or the like. It is therefore highly desired to support the location based message authentication for the CAN bus protocol.

In an optional implementation form of the first and/or second aspects one or more of the plurality of bus connected units is exclusively associated with multiple message types of the plurality of message types. In some bus protocols, for example, the CAN bus protocol, each message comprises a message type which is exclusively associated with a specific bus unit. As such each message type may be indicative of the originating bus unit which transmitted each message.

In a further implementation form of the first and/or second aspects, for each message, in case of a no match the probe determines the message is invalid and invalidates the message by broadcasting an error flag within an end of frame of the message. Invalidating invalid messages assures that the legitimate bus units ignore the invalid message to prevent malicious operation against the legitimate bus units. Moreover, using means, for example, the error flag broadcast defined by one or more of the bus protocols, for example, the CAN bus may significantly simplify integration of the location based message authentication scheme to such buses.

In a further implementation form of the first and/or second aspects, the reflector is configured to construct each of the plurality of reflection signals with an altered signal amplitude exceeding an amplitude threshold defined for signals of the plurality of messages such that each reflection signal is functionally transparent to the plurality of bus connected units. By constructing the reflection signals to be transparent to the bus units, the probe and reflector may be easily integrated with deployments comprising legacy bus units since the bus unit may require no alteration, adaptation and/or adjustment to adapt to the location based message authentication deployment.

In a further implementation form of the first and/or second aspects, the reflector is configured to construct each of the plurality of reflection signals with a different timing than a standard signal of the plurality of messages such that each reflection signal is functionally transparent to the plurality of other bus connected units. As described before, this may allow for easy deployment of legacy bus units in buses applying the (physical) location based message authentication.

In a further implementation form of the first and/or second aspects, the different timing comprising the reflection signal is asserted between a synchronization segment and a sample point of a first transition from a dominant state of the CAN bus to a recessive state of the CAN bus after detection of transmission of the certain message type in each message. Using timing definitions, for example, the synchronization segment and a sample point of the CAN bus protocol may significantly simplify integration of the location based message authentication scheme to bus deployments employing the CAN bus protocol.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
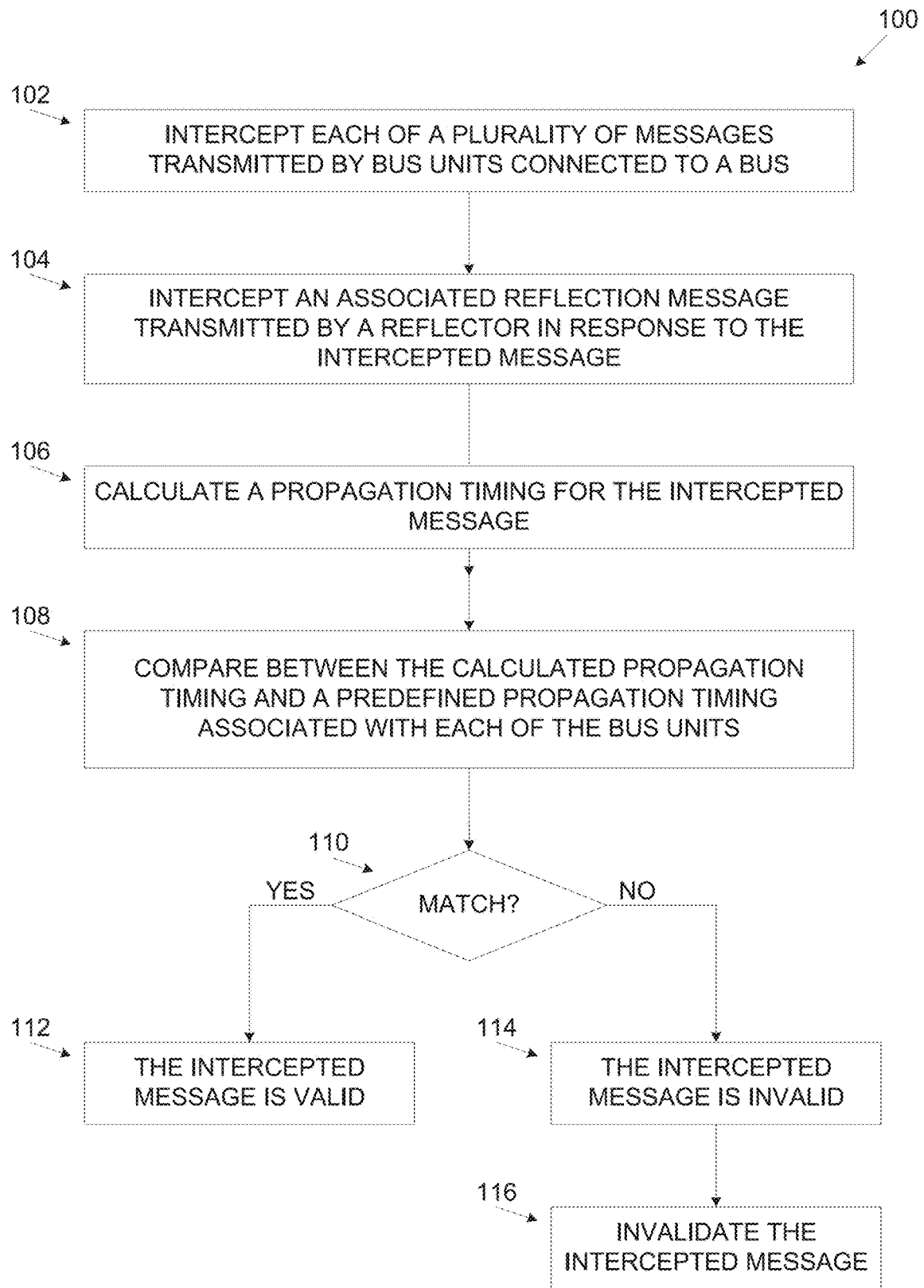
FIG. 1 is a flowchart of an exemplary process of authenticating an origin of messages transmitted on a bus based on verification of the message prorogation timing, according to some embodiments of the present invention.

The present invention, in some embodiments thereof, relates to authenticating an origin of messages transmitted on a bus, and, more specifically, but not exclusively, to authenticating the origin of messages transmitted on a bus based on verification of message prorogation timing indicative of a location of the message originating unit on the bus.

According to some embodiments of the present invention, there are provided methods, systems and computer program products for authenticating or invalidating an origin of messages transmitted by a plurality of bus units connected to a bus (bus connected units), specifically a line topology bus having two separate unconnected ends in which the units are statically connected to the bus at predefined connections points (physical location). The message authentication is based on verifying the physical location, in particular the location of the connection point of the bus units transmitting the messages. This is done by comparing a calculated propagation timing of the messages to propagation timing predefined for each of the plurality of bus units. Since the propagation speed of the messages' electrical signals on the bus is known (i.e. speed of light), the propagation timing of each message is indicative of the bus connection point of the originating bus unit which transmitted each respective massage according to the formulation of speed×time=distance. As the units are statically connected to the bus, their physical connection points may be associated with predefined propagation timing values and hence the originating device transmitting each message may be authenticated by comparing its calculated propagation timing to its corresponding predefined propagation timing.

While message authentication is common practice for many communication protocols, for example, internet protocols, TCP/IP based protocols and/or the like, applying message authentication in lower level, simpler and/or limited communication protocols which may be used in networks and/or buses which were traditionally considered as closed and/or inaccessible may present a major challenge. Such communication protocols may be limited with respect to band width, message size and/or the like and may typically involve real time processing and/or critical operational characteristics which may impose minimal communication latency. These communication protocols may lack specification defined security measures and may therefore be exposed to cyber threats and cyber-attacks. While traditionally deployed in closed and/or limited accessibility networks, for example, vehicles, industrial complexes and/or the like, some of these communication protocols are currently being deployed in systems which may be accessible to external, open networks. Moreover, these communication protocols may typically be band width limited and/or message size limited which may present further limitation to apply message authentication.

One example of particular interest is a car. Modern cars, in particular smart cars may provide high functionality through a plurality of subsystems installed in the car, for example, an engine control system, a transmission control system, an Anti-lock Braking System (ABS), an airbag control system, a lighting system, a climate control system, a steering wheel panel, a window/door locking system, an infotainment system, a multimedia system, a navigation system, an automated driving system and/or the like. Connectivity in the car may typically utilize a Controller Area Network (CAN) protocol traditionally used for interconnecting the car sub-systems. While in the past, the car infrastructure and/or the car sub-systems had no and/or limited accessibility, some sub-systems, for example, the infotainment system, the multimedia system, the navigation system, the automated driving system and/or the like may have communication interfaces to connect to remote networks, for example, the Internet. This may present a major concern since potential malicious users and/or automated tools may compromise one or more of the sub-systems and gain access into the car interconnection. Implementation of message authentication for these communication protocols, in particular the CAN bus protocol may therefore be of major interest.

The location based message authentication is based on calculating the propagation timing of each messages over the bus, in particular a line topology bus having two separate unconnected ends utilizing a bus communication protocol, for example, a CAN bus protocol, a serial bus protocol, an ARINC-429 protocol, a MIL-STD-1553 protocol and/or the like. Since the connection points of the plurality of bus units, for example, an Electrical Control Unit (ECU) and/or the like may be statically (fixed) connected to the bus at predefined static connection points, message propagation timing on the bus may be uniquely correlated and predefined for each of the bus units.

Message authentication may therefore be done by calculating the propagation timing for each message transmitted on the bus and comparing it with a plurality of predefined propagation timings each associated with a respective one of the bus units. A comparison match, i.e. the calculated propagation timing matches one of the predefined propagation timings may therefore indicate that the respective message was transmitted by a valid bus unit. A comparison no match, i.e. the calculated propagation timing does not match the predefined propagation timing of any of the bus units, on the other hand may indicate that the respective message was transmitted by an invalid and potentially malicious bus unit which is not part of the standard deployment and may be trying to impersonate as one of the valid (legitimate) bus units.

The location based message authentication may be implemented using a reflector (unit) connected to the bus at a first connection point and a probe (unit) connected to the bus at a second connection point where the plurality of the bus units are connected to the bus between the first point and the second point, i.e. between the reflector and the probe.

The reflector injects (transmits) a reflection (echo) signal in response to every message transmitted on the bus, typically immediately following detection of the message identifier (ID) included in each of the messages. In order to associate each of the reflection signals with the respective message that triggered the transmission reflection signal, the reflector may include the ID of the respective message into the reflection signal. The probe monitors the bus traffic to intercept each transmitted message and detect the plurality of reflection signals each injected by the reflector in response to a respective one of the messages. In order to maintain proper operation of the other bus units and/or avoid possible modifications to the other bus units, the reflector may be configured to construct the reflection signals with altered physical characteristics (e.g. signal amplitude, timing, etc.) such that the reflection signals may be transparent and/or discarded by the bus units. The probe however is configured to detect the reflection signals.

For each intercepted message the probe calculates the propagation timing between the detection time of the message and the detection time of the associated reflection signal injected by the reflector in response to the intercepted message. The probe may then compare the calculated propagation timing to the plurality of predefined propagation timings associated with the plurality of bus units. In case the calculated propagation timing matches one of the predefined propagation timing values, the probe may determine that the intercepted message is a valid message which was transmitted by a legitimate bus unit. However, in case the calculated propagation timing does not match the predefined propagation timing of any of the bus units, the probe may determine that the intercepted message is invalid and potentially a malicious message which was transmitted by an invalid and potentially malicious unit which connects to the bus but is not authorized to do so. In case the probe determines the intercepted message is invalid, the probe may further invalidate the intercepted message and instruct the bus units to discard it.

Optionally, some of the protocols implemented on the bus may define that each of the messages comprises an originating unit ID implemented according to the respective bus communication protocol. The originating unit ID may indicate a certain one of the bus units which transmitted the message. For example, in the CAN protocol each message comprises a message type field (arbitration field) which is exclusively associated with one of the bus units. Naturally, while each message type may be exclusively associated with a single bus unit, each bus unit may be exclusively associated with multiple messages. In case the message includes the originating unit ID, the probe may extract the ID from the message and compare the calculated propagation timing to one of the predefined propagation timings which is associated with the bus unit having the extracted ID.

Predefining the propagation timing for one or more of the bus units may be done manually according to the unit(s)' connection point(s) actual physical location. Optionally, the propagation timing may be dynamically predefined for one or more of the bus units through an initialization process that may employ cryptography in which public and/or private (symmetric) keys may be used to identify each of the bus units. The respective propagation timing may be calculated for each of the bus units timing during the initialization process and set as the respective predefined propagation timing. In order to avoid loading the bus, the initiation of the initialization process may be limited, for example, after deployment of the bus units, after altering the bus deployment (e.g. adding, removing, moving bus unit(s)), periodically (e.g. when the vehicle is started) and/or on command.

Optionally, the probe and the reflector are integrated in a single device having a plurality of separate bus interfaces such that the integrated reflector connects to the first point of the bus through a first bus interface of the single device and the probe connects to the second point of the bus through a second bus interface of the single device. Naturally, the integrated single device may be used for buses having a physical deployment in which the first point and the second point of the bus at relatively in close proximity to allow connection of the first and second bus interfaces to the first and second points of the bus respectively.

The location based message authentication may further be applied to segmented bus deployments in which the bus is divided to a plurality of bus segments (i.e. two segments or more) each deployed in a line topology. Such deployments include a reflector connected to the first point of each bus segment and a unified probe comprising a plurality of probes each connected to the second point of a respective one of the bus segments. Optionally, the unified probe serves as a bridge between two or more of the bus segments.

The location based message authentication may present significant advantages compared to currently existing message authentication methods.

Some of the message authentication existing methods, for example, the CANAuth protocol, the Tesla protocol, the CaCAN protocol and other apply cryptography for authenticating the messages. In the cryptography based methods, the messages may be encrypted using keys which identify the originating (transmitting) bus unit. Such methods which apply cryptography based authentication may present major limitations. First, each of the bus units may introduce increased design and/or implementation complexity and hence cost as the bus units need to be adapted to encode and/or decode the cryptographically encrypted messages. Moreover, the cryptography based authentication may prevent attaching to the bus legacy bus units lacking the encoding/decoding capability. Furthermore, the cryptography encrypted messages may significantly increase the size of the messages. This may inflict a major limitation for at least some of the bus protocols, for example, the CAN protocol, the serial protocol, the ARINC-429 protocol, the MIL-STD-1553 protocol and/or the like which may have limited bandwidth due to, for example, inherent protocol limitations, low clocking speed, small message size, large timing overhead and/or the like. Therefore applying the cryptography based authentication may essentially reduce bus utilization and/or bus bandwidth. In addition, the cryptography based message authentication may significantly increase the communication latency. This may result from the need to transmit large messages and/or a plurality of messages to accommodate the cryptographic encryption. Encoding and/or decoding the cryptography encrypted messages may further increase the processing time at one or more of the bus units. Lastly, the cryptography based message authentication methods, if not designed with caution, may be vulnerable to Man-In-The-Middle attacks in which a malicious unit connected to the bus intercepts messages from one or more of the bus units and impersonates as the destination unit of the message.

Other message authentication existing methods, for example, the CMI-ECU protocol may use a monitor unit (node) which applies detection algorithms such as pattern matching filters, heuristic detection filters and/or the like to identify malicious messages. Such methods which are rule based may fail to detect all malicious messages since not all malicious messages may be covered by the rules and/or recorded in the past. Moreover, such methods may also be vulnerable to the Man-In-The-Middle attacks.

Yet other message authentication existing methods, for example, the Parrot method may employ unit self-detection of invalid messages. These methods are based on the ability of the bus units themselves to identify messages they did not send. Whenever a certain bus unit intercepts a message which is identified as originating from the certain bus unit, the certain bus unit may determine that the detected message is a malicious one and inform the other bus units of the intercepted malicious message. For example, in the CAN bus protocol, assuming the certain bus unit intercepts a message of a certain message type exclusively associated with the certain bus unit and which the certain bus unit did not transmit, the certain bus unit may determine that the detected message is malicious. The certain bus unit may start transmitting messages at maximum speed in order to cause collisions with future malicious messages and invalidate them. This method takes advantage of the "transmit error count" of the CAN protocol in order to eventually shut down the potential attacker transmitting the malicious messages. The transmit error count is incremented each time a collision occurs until eventually the attacker goes into a "bus-off" state in which the CAN controller prevents sending messages on the bus. These methods may significantly increase the load on the bus and thus prevent other legitimate bus units to properly communicate over the bus. This may therefore significantly undermine the entire bus communication in terms of band width and communication latency.

The location based message authentication on the other hand may overcome many of the limitations of the currently existing methods. First, since no cryptography is applied, complexity of the bus units may be significantly reduced and legacy bus units may be attached to the bus. Moreover, the bus bandwidth utilization may be maintained since the propagation timing based message authentication is done simultaneously with the message transmission itself and typically transparently to the bus units. Also there is no need to encode each message through increased size messages and/or multiple messages thus further reducing the bus bandwidth utilization. Furthermore, the communication latency may be maintained as in normal deployments of the bus communication protocols since the propagation timing based message authentication may not inflict a timing addition and/or overhead on the message transmission and/or authentication. In addition, for segmented bus deployments, the unified probe may serve as a bridge for relaying messages between bus segments thus allowing supervised connectivity between functionally isolated bus units.

Moreover, applying the secure cryptography based initialization process for predefining the propagation timing may significantly increase security, protection and robustness of the location based message authentication mechanism against potential attackers having access to the bus.

Furthermore, by constructing the reflection signals to be transparent and/or discarded by the bus units, the probe and reflector may be easily integrated with deployments comprising legacy bus units. The bus unit may therefore require no alteration, adaptation and/or adjustment to adapt to the location based message authentication deployment. This may significantly reduce the complexity as well as cost for deploying the probe and reflector Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of authenticating an origin of messages transmitted on a bus based on verification of the message prorogation timing, according to some embodiments of the present invention. A process 100 may be executed to authenticate or invalidate an origin of messages transmitted by a plurality of units connected to a bus utilizing line topology by verifying the physical location of the originating bus connected units on the bus, in particular the physical location of the connection point of the originating bus units to the bus. The bus units (bus connected units) are connected to the bus at static fixed predefined locations which may not be altered during operation, after initialization and/or after deployment. The messages may therefore be authenticated by comparing a propagation timing calculated for each of the messages with a plurality of predefined propagation timing values each associated with a respective one of the bus units.

A reflector device is connected to the bus at a first point and a probe is connected to the bus at a second point where all the other bus units connect to the bus between the first point and the second point. The reflector injects (transmits) a reflection (echo) message in response to every message transmitted on the bus such that each of the reflection signals is associated with a respective message. Each reflection signal typically includes an ID of its associated message, i.e. the message that triggered the reflector to transmit the reflection signal. The reflector may transmit the reflection signal to maintain a temporal relation between each reflection signal and its associated message, for example, the reflector may transmit the reflection signal immediately following detection of the message ID included in each of the messages and/or the like. The probe monitors the bus traffic to intercept each message transmitted on the bus and each of the plurality of reflection signals. In order to maintain the operation of the other bus units, the reflector may be configured to construct the reflection signals to be transparent to the bus units while the probe is configured to detect the reflection signals.

For each intercepted message the probe calculates the propagation timing between the detection time of the message and the detection time of the associated reflection signal injected by the reflector for the intercepted message. The probe may then compare the calculated propagation timing to each of a plurality of predefined propagation timings (values) each assigned (associated) to a respective one of the plurality of bus units. In case the calculated propagation timing matches one of the predefined propagation timings, the probe may determine that the message is a valid message. However, in case the calculated propagation timing does not match the predefined propagation timing of any of the bus units, the probe may determine that the message is invalid. The probe may notify the bus units of validity of each of the intercepted messages. For example, in case the probe determines the message is invalid, the probe may invalidate the invalid message and/or instruct the CAN bus units to discard it.

Figure 2:
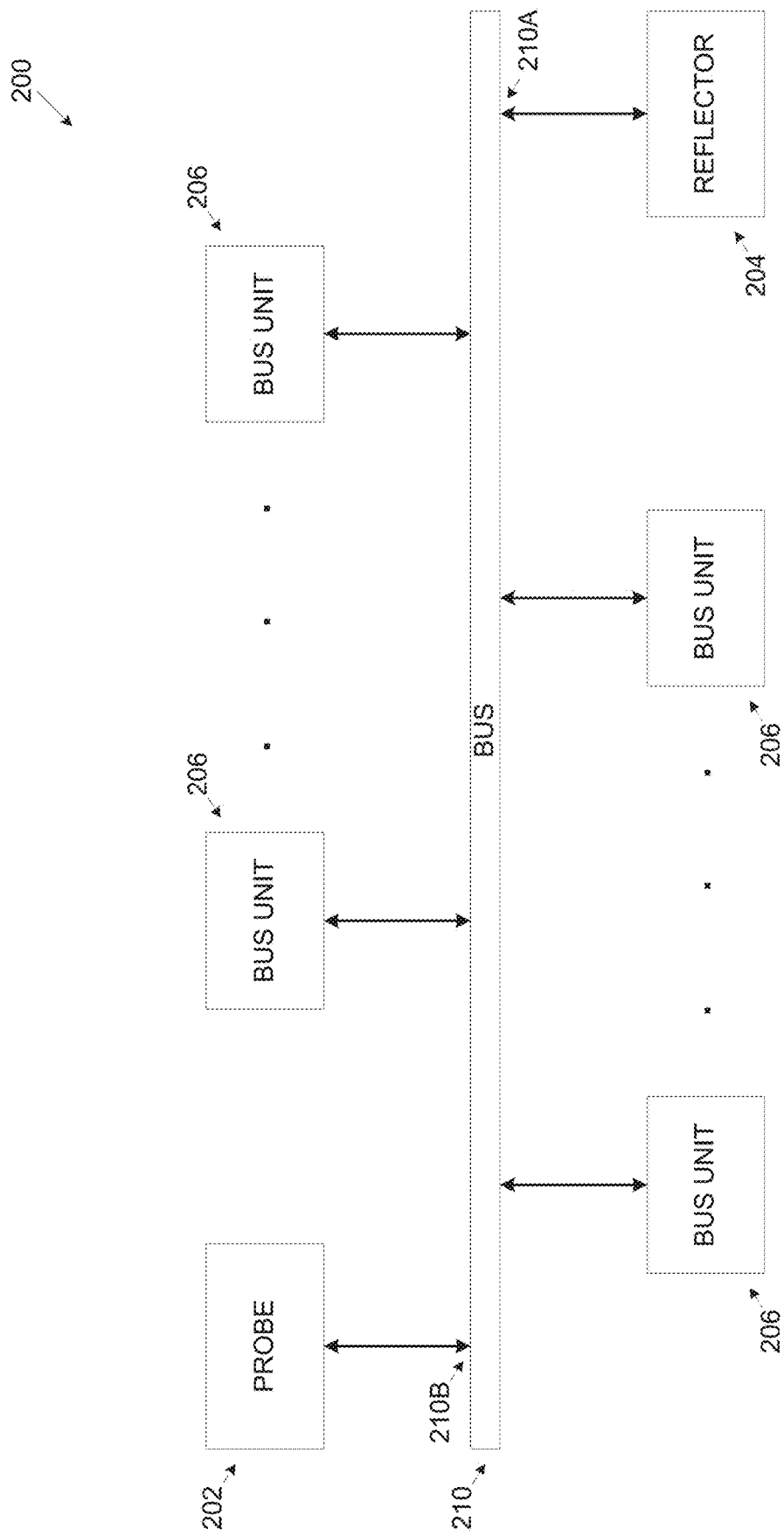
FIG. 2 is a schematic illustration of an exemplary system for authenticating an origin of messages transmitted on a bus based on verification of message prorogation timing, according to some embodiments of the present invention.

Reference is also made to FIG. 2, which is a schematic illustration of an exemplary system for authenticating an origin of messages transmitted on a bus based on verification of the messages prorogation timing, according to some embodiments of the present invention. An exemplary system 200 for executing a process such as the process 100 includes a reflector 204 connected at a first point 210A to a bus 210 and a probe 202 connected to the bus 210 at a second point 210B. The bus 210 utilizes a line topology, i.e. having two separate unconnected ends and may implement one or more communication protocols, for example, a CAN bus protocol, a serial bus protocol, an ARINC-429 protocol, a MIL-STD-1553 protocol and/or the like. A plurality of bus units (bus connected units) 206, for example, an Electrical Control Unit (ECU), a computing node and/or the like may be connected to the bus 210, in particular, the bus units 206 connect to the bus 210 between the first point 210A and the second point 210B. Moreover, the location of the connection points of the bus units 206 to the bus 210 is static (fixed) and may not be changed after initializing the system 200, for example, during operation, after initialization and/or after deployment. The system 200 may be deployed in a plurality of platforms, environments and/or installations, for example, a land vehicle (e.g. a car, a military vehicle, etc.), an aerial vehicle (e.g. a plane, a helicopter, a drone, etc.) and/or the like. It should be noted that while one or more embodiments of the present invention may apply to one or more of the bus protocols utilizing the bus 210, various embodiments of the present inventions are demonstrated for the CAN bus protocol which may be deployed in a vehicle, for example, a car.

Figure 3:
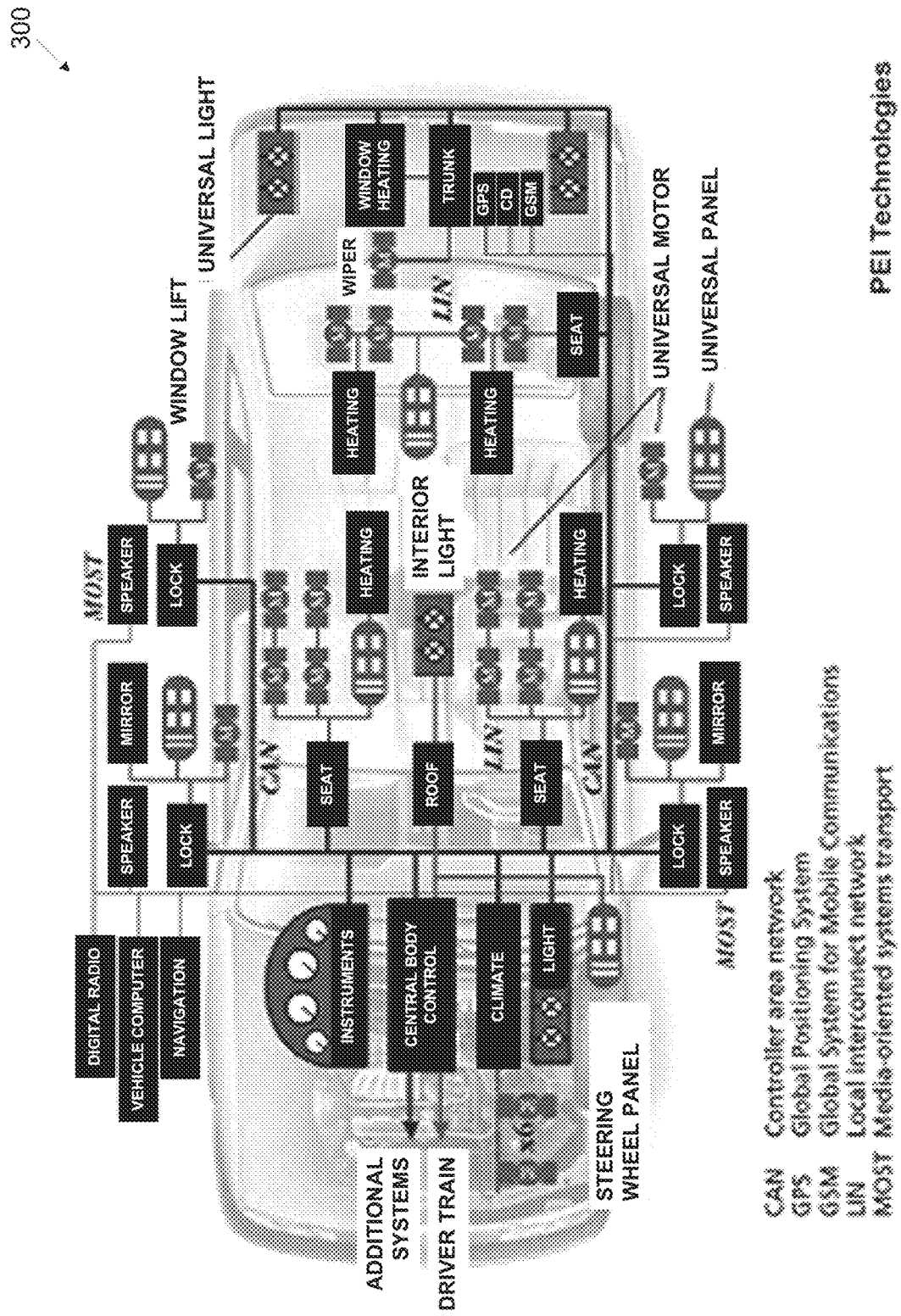
FIG. 3 is a schematic illustration of an exemplary CAN bus deployment in a car.

Reference is also made to FIG. 3, which is a schematic illustration of an exemplary CAN bus deployment in a car. An exemplary system 300 which may be deployed in a car may include one or more buses, for example, a CAN bus, a Local Interconnect Network (LIN), a Media Oriented System Transport (MOST) and/or the like which may connect various subsystems of the car, for example, an engine control system, a transmission control system, an Anti-lock Braking System (ABS), an airbag control system, a lighting system, a climate control system, an infotainment system, a multimedia system, a steering wheel panel, a window/door locking system and/or the like. Optionally, one or more of the buses, for example, the CAN bus are divided to several segments to isolate critical systems from other systems in order to increase security, integrity and/or reliability of the critical systems.

Reference is made once again to FIG. 1 and FIG. 2.

The probe 202 and the reflector 204 may each include one or more bus interfaces for connecting to the bus 210. The bus interfaces are configured to apply the bus communication protocol, for example, the CAN bus protocol, the serial bus protocol, the ARINC-429 protocol, the MIL-STD-1553 protocol and/or the like for operatively connecting to the bus 210. The probe 202 and/or the reflector 204 may be processing units having one or more homogenous or heterogeneous processors which may execute one or more software modules, for example, an application, an agent, a script and/or the like which comprise a plurality of program instructions executed by the processor(s) from one or more non-transitory storage device of the respective processing unit(s). In particular, the processor(s) of the probe 202 may a probe software module(s) for authenticating/invalidating the origin of each of the plurality of messages intercepted while transmitted on the bus 210. The processor(s) of the probe 202 executing the probe software module(s) and/or additional software module(s) may perform additional operations, for example, initializing the authentication mechanism and/or the like. The processor(s) of the reflector 204 may execute a pinging software module(s) for injecting a reflection signal on the bus 210 in response to detection of each of the messages transmitted on the bus 210. Additionally and/or alternatively, the probe 202 and/or the reflector 204 may include a logic circuit, for example, a device, a Field Programmable Grid array (FPGA), an Application Specific Integrated Circuit (ASIC) and/or the like executing hardwired logic, firmware and/or the like to execute the operational functions of the probe 202 and/or the reflector 204 respectively.

As shown at 102, the process 100 starts with the probe 202 monitoring the traffic on the bus 210 to intercept each of the plurality of messages transmitted on the bus 210 by one or more of the bus units 206.

Optionally, in case the protocol used in the bus 210 defines that each of the messages includes an ID field indicative of its originating bus unit 206, the probe 202 may identify the originating unit which transmitted each intercepted message by analyzing the ID field included in each message. For example, in the CAN bus protocol, each message comprises a message type identifier field (arbitration field). Moreover, in the CAN bus implementation each message type is exclusively associated with only one of the bus units 206 such that only a single one of the bus units 206 may transmit messages of a certain message type thus the message type identifier uniquely identifies the originating unit of the bus units 206 which transmitted the intercepted message. For example, a steering wheel message type assigned to message(s) containing steering wheel panel status/command data may be transmitted by a single bus unit 206, for example, the steering wheel panel. In another example, a transmission message type assigned to message (s) containing transmission control data may be transmitted by a single bus unit 206, for example, the transmission control system. According to the CAN bus protocol, while each message type is exclusively associated with a single bus unit 206, each bus unit 206 may be exclusively associated with one or more message types to allow one or more bus units 206 to transmit message of several message types. Therefore, in case the bus 210 employs the CAN bus protocol, the probe 202 may analyze each intercepted message to identify the message type of the intercepted message which uniquely identifies the originating unit 206 which transmitted the intercepted message.

As shown at 104, the probe 202 monitoring the bus 210 may intercept one or more reflection signals injected (transmitted) to the bus 210 by the reflector 204. The reflector 204 monitoring the traffic and activity on the bus 210 may inject a reflection signal for each of the plurality of messages transmitted on the bus 210 by one or more of the bus units 206. Optionally, each of the reflection signals is temporally associated with a respective massage of the plurality of messages, meaning that the reflector 204 injects each reflection signal during and/or immediately following the transmission of the respective message. The reflector 204 may create each of the reflection signals to include an ID of its associated message in order to associate each of the reflection signals with its respective message. The probe 202 may therefore distinguish and associate each reflection signal(s) with its respective message. While the reflector 204 may inject multiple reflection signals for each message, in order to maintain simplicity and efficiency of the bus operation, the reflector 204 may inject a single reflection signal for each detected message. Typically, in the CAN bus protocol implementation, the reflector 204 may inject the reflection signal following the message type ID field of the respective message.

Moreover, the reflector 204 may be configured to construct the reflection signals to be transparent to the other bus units 206 while detected by the probe 202. This may allow maintaining proper operation of the bus 210 in particular operation of the bus units 206 which may be unaware of the reflection signals and hence may require no modifications to their hardware and/or software implementation. The reflector 204 may be adapted, for example, to construct the reflection signals with altered signal amplitude and/or different timing compared to standard signals transmitted on the bus 210 by the bus units 206.

For example, in the CAN bus protocol implementation, the reflector 204 may be adapted to construct the reflection signals using dominant state signals having altered amplitude which may be greater or smaller than the amplitude of standard dominant state signals generated by the bus units 206 to encode their messages. The altered amplitude of the reflection signals may exceed a dominant state signal voltage levels as defined by the CAN bus specification and may therefore be transparent and/or discarded by the bus units 206 as an invalid state of the bus 210. For example, assuming the reflection signals are constructed using signal having higher amplitude than the maximal input voltage level of the dominant state, the reflection signals may be discarded by the bus units 206. In another example, assuming the reflection signals are constructed using signals having lower amplitude than the minimal input voltage level of the dominant state, the reflection signals may be discarded by the bus units 206. The probe 202 on the other hand, is configured to detect the altered amplitude of the reflection signals. In another example, in the CAN bus protocol implementation, the reflector 204 may inject the reflection signals with different timing than the signals transmitted by the bus units 206 to encode the messages. Bit timing in the CAN bus protocol comprises four segments—a synchronization segment, a propagation segment and two phase segments 1 and 2. The reflector 204 may be configured, for example, to inject each reflection signal between a synchronization segment and a sample point defined as the first transition from dominant to recessive state of the bus 210 following the message type identifier field in the respective message. The reflection signals employing different timing which is not defined by the CAN bus specification may therefore be transparent to the bus units 206 and/or discarded by the bus units 206 as invalid signals. The probe 202 on the other hand, is configured to detect the different timing reflection signals.

As shown at 106, the probe 202 calculates a propagation timing for each intercepted message between the detection time of the intercepted message and the detection time of the associated reflection signal injected by the reflector 204 in response to the intercepted message. As described before, the reflector 204 and the probe 202 are located on the bus 210 at the two external points 210A and 210B respectively such that all the bus units 206 are connected to the bus between the points 201A and 201B. The propagation timing therefore reflects the travel time of signals from the originating bus unit 206 which transmitted the intercepted message to the reflector 204 and the travel time of signals from the originating bus unit 206 to the probe 202. Since the propagation (travel) speed of the signals is fixed, i.e. the speed of light, the propagation timing is indicative of the physical location of the originating bus unit 206 on the bus 210, specifically of the location of the connection point of the originating bus unit 206 to the bus 210.

Figure 4A:
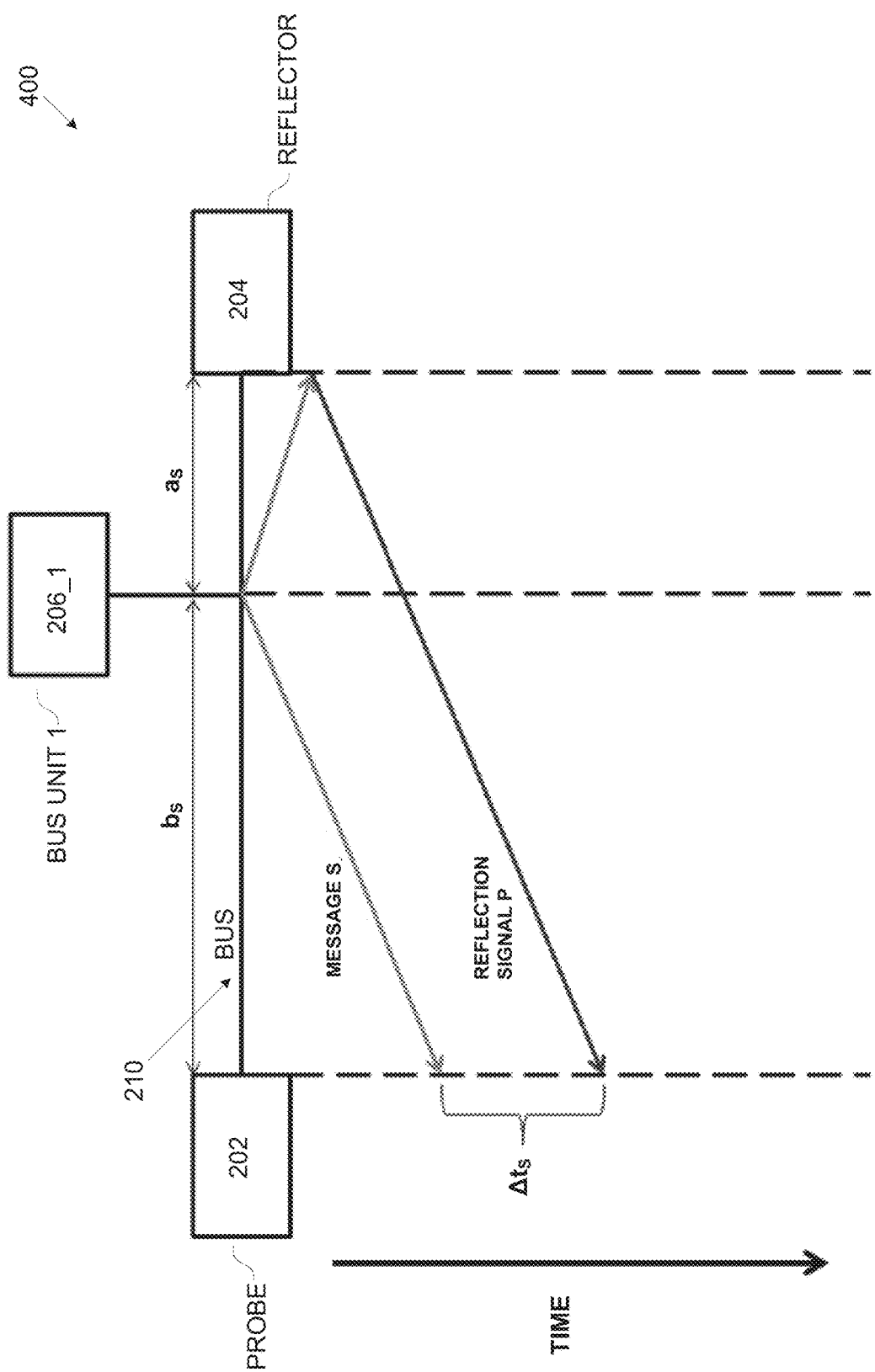
FIG. 4A and FIG. 4B are schematic illustration of exemplary message propagation sequences for computing propagation timing of messages transmitted on a bus, according to some embodiments of the present invention.
Figure 4B:
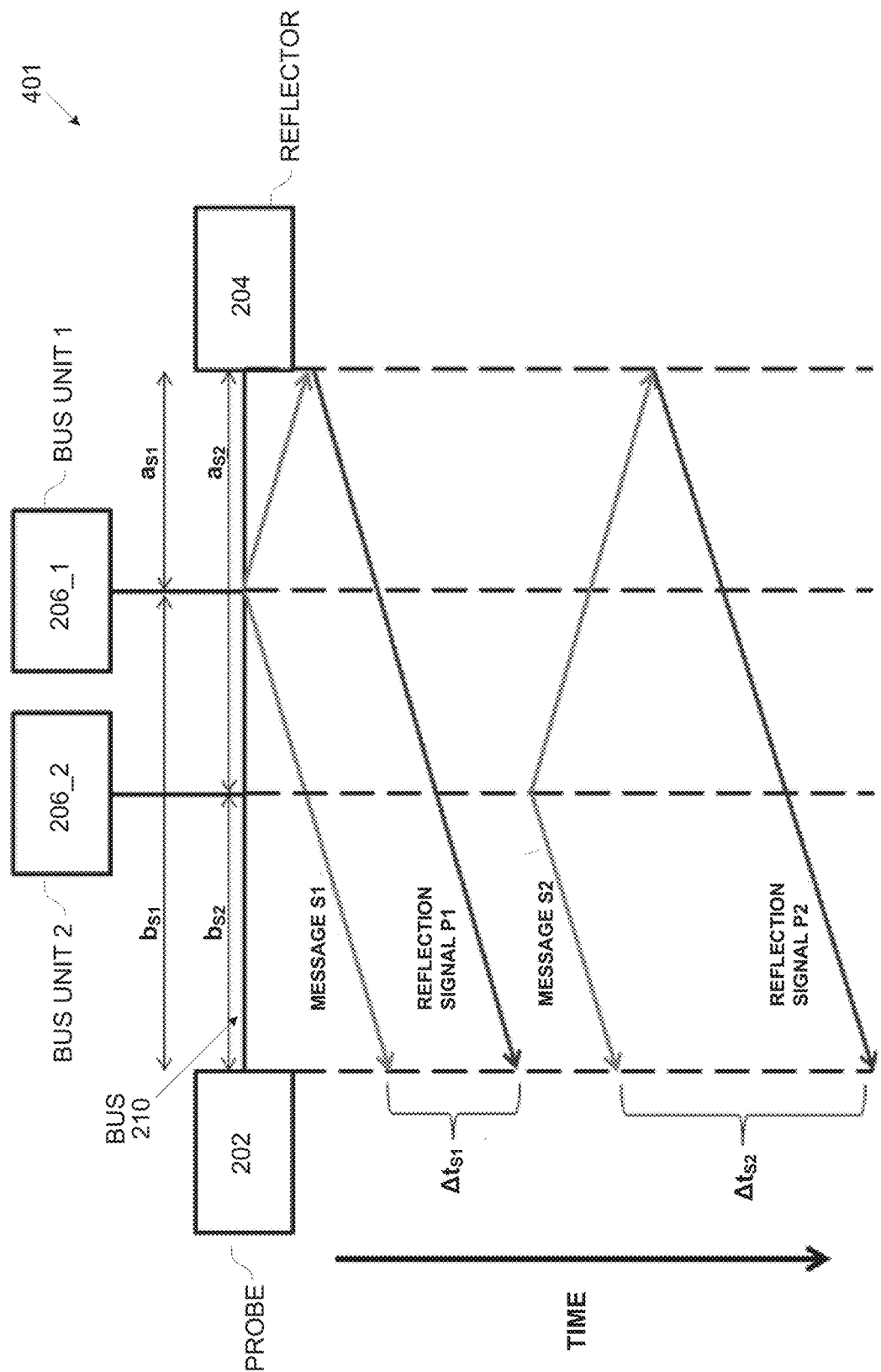

Reference is now made to FIG. 4A and FIG. 4B, which are schematic illustration of exemplary message propagation sequences for computing propagation timing of messages transmitted on a bus, according to some embodiments of the present invention. Illustration 400 presents an exemplary propagation timing computation for a message S transmitted on a bus such as the bus 210 by a certain bus unit 206_1 such as the bus unit 206. As seen in the illustration 400, the bus unit 206_1 is connected to the bus 210 between connection points of a probe such as the probe 202 and a reflector such as the reflector 204. The reflector 204 transmits an associated reflection signal P in response to the message S, i.e. following interception of the message S at the reflector 204. The travel (propagation) time of an electrical signal through the bus 210 which is assumed to be the speed of light c is fixed and known to be approximately $$c \approx 0.3 \frac{m}{ns}.$$

The probe 202 intercepts the message S and the associated reflection signal P transmitted by the reflector 204 in response to the message S. The probe 202 may calculate a propagation timing $\Delta t_S$ for the message S. As can be seen, the travel (propagation) time of a signal from the bus unit 206_1 to the reflector 204 is designated $a_S$ and the propagation time of a signal from the bus unit 206_1 to the probe 202 is designated $b_S$. Assuming the message S is transmitted by the bus unit 206_1 at time t, the message S is detected by the reflector 204 at time $t+a_S$ and by the probe 202 at time $t+b_S$. The reflector 204 may therefore inject (transmit) the reflection signal P associated with the message S at time $t+a_S$. Since the travel time of the associated reflection signal P from the reflector 204 to the probe 202 is $a_S+b_S$, the probe 202 may intercept the associated reflection signal P at time $t+a_S+a_S+b_S=t+2a_S+b_S$. The propagation timing $\Delta t_S$ of the message S is therefore $\Delta t_S=t+2a_S+b_S-(t+b_S)$, i.e. $\Delta t_S=2a_S$. As evident, the propagation timing $\Delta t_S$ is directly proportional to the distance of the bus unit 206_1 from the reflector 204. This means that the propagation timing $\Delta t_S$ shortens the closer the unit 206_1 is to the reflector 204 (on the bus 210) and vice versa, the propagation timing $\Delta t_S$ increases the further away the unit 206_1 is from the reflector 204 (on the bus 210).

It may be demonstrated that the accuracy of the calculated propagation timing is sufficient for practical deployments of the system 200, for example, in a vehicle such as, for example, in a car, in a plane, in a helicopter, in a boat and/or the like. Let N be an accuracy of the measurement and calculation of the propagation timing $\Delta t$ expressed in nanoseconds [ns]. The accuracy N is typically derived from the clock used by the probe 202 and physical properties of the bus, for example, assuming a clock of 1 GHz, the accuracy N may be defined as N=1 [ns]. Designating $\Delta d$ as the distance between the bus unit 206_1 and the reflector 204, $\Delta d = a_S \cdot c$. Since $\Delta t = 2a_S$, it may be we deduced that $$\Delta d = \frac{\Delta t \cdot c}{2}.$$

The accuracy of $\Delta d$ may therefore be expressed as $$\frac{0.3 \cdot N}{2} [m].$$

The accuracy N may be adjusted according to the actual deployment of the system 200, in particular according to the distance $\Delta d$ between the connections points of the bus units 206 to the bus 210. For example, assuming N=1 [ns], the accuracy of $\Delta d$ is approximately 15 [cm]. Such an accuracy N may therefore allow distances of approximately 50 [cm], between connections points of the of the bus units 206 to the bus 210 while the probe 202 may be still able to distinguish, based on the calculated propagation timing $\Delta t$, between messages transmitted by each of the bus units 206. Such accuracy N may be sufficient for most practical deployments of the system 200. In case the distance between the connections points of the of the bus units 206 to the bus 210 is required to be smaller, for example, 5 [cm], the accuracy N may need to be defined to be N=0.3 [ns] which may imply using a clock of 3.3 GHz. However, many practical deployments of the system 200 may typically require a significantly lower accuracy N, for example, N=10 [ns] (implying a 100 MHz clock) since the connections points of the of the bus units 206 to the bus 210 are significantly large, for example, 5[m] from each other.

As shown in illustration 401, which presents an exemplary propagation timing computation for messages transmitted on the bus 210 by two bus units 206_1 and 206_2 such as the bus units 206. As seen in the illustration 401, the bus units 206_1 and 206_2 are connected to the bus 210 between the connection points of the probe 202 and the reflector 204. The bus unit 206_1 transmits a message S1 and the bus unit 206_2 transmits a message S2. The reflector 204 transmits reflection signals P1 and P2 in response to the messages S1 and S2 respectively.

The probe 202 intercepts the message S1 and its associated reflection signal P1 transmitted by the reflector 204 in response to the message S1. The probe 202 may calculate propagation timing $\Delta t_{S1}$ for the message S1 which according to the computation presented herein above is defined by $\Delta t_{S1}=2a_{S1}$. Similarly, the probe 202 intercepts the message S2 and its associated reflection signal P1 transmitted by the reflector 204 in response to the message S2. The probe 202 may calculate propagation timing $\Delta t_{S2}$ for the message S2 which according to the computation presented herein above is defined by $\Delta t_{S2}=2a_{S2}$. Evidently, as explained herein above, $\Delta t_{S2} > \Delta t_{S1}$ since the bus unit 206_2 is further away from the reflector 204 than the bus unit 206_1.

Reference is made once again to FIG. 1 and FIG. 2.

As shown at 108, the probe 202 compares (matches) the calculated propagation timing with each of a plurality of predefined propagation timings each associated with a respective one of the plurality of bus units 206. Since the location of the connection points of the bus units 206 to the bus 210 is static, the propagation timing may be predefined for each bus unit 206 where the propagation timing is indicative of the physical location of the bus unit 206 as demonstrated herein above.

Optionally, in case the bus protocol utilized on the bus 210 defines that each message includes an ID indicative of its originating bus unit 206, the probe 202 may use the ID extracted from the intercepted message to select, obtain, retrieve and/or fetch t predefined propagation timing associated with the originating unit 206 indicated by the ID extracted from the intercepted message. For example, as described herein above, in the CAN bus protocol, each message comprises a message type which uniquely identifies the originating bus unit 206 which transmitted the message and may thus serve as the ID of the originating bus unit 206. Therefore in the CAN bus protocol implementation, the predefined, the predefined propagation timing values may be predefined for each message type and the probe 202 may compare the calculated propagation timing to the predefined propagation timing associated the message type of the intercepted message.

The probe 202 may retrieve the predefined propagation timing values for the bus units 206 from a locally stored record, for example, a file, a list, a table and/or the like which may be designated as Time Difference Message Type (TDMT). The TDMT may include a plurality of entries each associating between a certain bus unit 206 and its respective predefined propagation timing. For example, in the CAN bus protocol implementation, the TDMT may associate between message type and their respective propagation timing values. Since each of the message types is exclusively associated with a single one of the bus units 206, the respective bus unit 206 may be directly derived from the message type.

The TDMT may be fixed with entries calculated according to the location of each of the bus units 206 on the bus 210, specifically with respect to the reflector 204 and the probe 202. Applying the fixed TDMT may require no modification of the bus units 206 to support initialization of the TDMT. For example, assuming the system 200 is deployed in a car, the TDMT may be set by the manufacturer of the car according to the connection points of the installed bus units 206. Optionally, the TDMT may be modified after deployment in case one or more additional bus units 206 are added and connected to the bus 210. For example, assuming a garage mechanic installs an additional bus unit 206 during a maintenance session for the car, the mechanic may modify the TDMT to include an entry associating between the additional bus unit 206 and its respective propagation timing. Moreover, in the CAN bus protocol implementation, the TDMT may be modified following a firmware update in which one or more message types are added, removed and/or re-associated with another bus units 206.

Optionally, the TDMT is created dynamically through an initialization process which may be initiated by the probe 202. The probe 202 may initiate the initialization process in a plurality of modes, for example, after deploying the bus 210, periodically following a power-on, a reset and/or an initialization of the bus 210, following a firmware and/or software update of the probe 202, at predefined time intervals, on command and/or the like. For example, assuming the system 200 is deployed in a car, the probe 202 may be configured to initiate the initialization process every time the car is started. To create the TDMT, the probe 202 may instruct one or more of the bus units 206 to transmit one or more unit authentication messages. The probe 202 may then calculate the propagation timing for the unit authentication message(s) using the reflection signals injected by the reflector 204 for each of the unit authentication message(s) and set the calculated propagation timing as the predefined propagation timing for the respective bus unit 206. Dynamically initializing the TDMT may significantly increase flexibility of the system 200 to include additional bus units 206, remove bus units 206, move connection points of bus units 206 and/or the like and automatically update the TDMT entries with the predefined propagation timing for the added, removed and/or moved bus units 206. In the CAN bus protocol implementation, the authentication messages may relate to message types which in turn identify their respective exclusively associated bus units 206. The probe 202 may instruct one or more of the bus units 206 to transmit the unit authentication message(s) for each of their exclusively associated message types. The probe 202 may then calculate the propagation timing for the unit authentication message(s) for each message type using the reflection signals injected by the reflector 204 for each of the unit authentication message(s). The probe 202 may update the calculated propagation timing in the TDMT set as the predefined propagation timing for the respective message type(s).

In some implementations, for example, for the CAN bus protocol, the unit authentication messages transmitted by the bus units 206 during the initialization process may need to be distinguished from regular messages. For the CAN bus protocol this distinction may be accomplished by using a bit "r0" which is reserved in the CAN bus message according to the CAN specification. The CAN specification dictates that the "r0" bit must be transmitted in the dominant state and may be received as dominant or recessive (i.e. don't care). The reserved "r0" may therefore be used to distinguish the unit authentication messages in which the bit "r0" may be set to the recessive state from the regular messages in which the bit "r0" may be set to the dominant state.

Additionally and/or alternatively, the TDMT may be created dynamically through a secure cryptography based initialization process in which one or more of the bus units 206 encrypts the unit authentication message(s) using a message authentication code (MAC) with encryption keys. Naturally, the bus units 206 as well as the probe 202 need to be configured to support the encrypted cryptography based initialization process. The cryptography based initialization process may be implemented using private keys which are each shared by a respective one of the bus units 206 and the probe 202. Each of the private keys may be set in the respective bus unit 206 and in the probe 202 during installation and/or deployment of the system 200. Additionally and/or alternatively, the cryptography based initialization process may be implemented using public keys for example, by employing a public key infrastructure (PKI). Using the public key encryption may reduce complexity as updating the probe 202 when adding additional bus unit(s) 206 may be avoided. Since the encryption keys and/or signatures may be too long to be encoded in a single message, in some of the bus protocols, for example, in the CAN bus protocol, the bus units 206 may split the transmission of their respective encryption keys and/or signatures to multiple unit authentication message(s).

Assuming the probe is familiar with the private (secret) key of a certain bus unit 206, the public key initialization process starts with the probe 202 sending a nonce random number to the certain bus unit 206. The certain bus unit 206 transmits one or more unit authentication message(s) encrypted using the private key, the unit identifier (originating unit identifier) of the certain bus unit 206 and the nonce random number received from the probe 202. The probe 202 may intercept the unit authentication message(s) and the respective reflection signal(s) injected in response to these unit authentication message(s) and compute the propagation timing for the certain bus unit 206. The process may be repeated with other nonce random number to verify identity of the certain bus unit 206. Once verified, the probe 202 may update the TDMT with the computed propagation timing which may serve as the predefined propagation timing for all future messages transmitted by the certain bus unit 206. As stated herein above, dynamically initializing the TDMT may significantly increase flexibility of the system 200 to include additional bus unit(s) 206, remove bus unit(s) 206 move connection point(s) of bus unit(s) 206 and/or the like.

Applying the secure cryptography based initialization process may significantly increase security, protection and robustness of the system 200 against potential attackers having access to the bus 210. For example, assuming a certain legitimate bus unit 206 is replaced with a malicious bus unit connected to the bus 210 at the same connection point as the certain bus unit 206. Since the malicious bus unit has no access to the private key of the certain bus unit 206, the malicious bus unit may fail to properly encrypt the unit authentication message(s) during the cryptography based initialization process.

As shown at 110, which is a condition step, the probe 202 determines validity of each intercepted message transmitted on the bus 210 according to a match result of the comparison between the calculated propagation timing and the predefined propagation timings associated in the TDMT with the bus units 206. In case of a match of the calculated propagation timing with one of the predefined propagation timing values, the process 100 branches to step 112. Otherwise, in case of no match, i.e. the calculated propagation timing does not match the predefined propagation timing of any of the bus units 206, the process 100 branches to step 114.

As shown at 112, the probe 202 determines that the intercepted message is valid, i.e. the probe 202 authenticates the origin of the intercepted message. In such case the probe 202 may take no further action and allow the transaction of the intercepted message to proceed normally. Optionally, the probe 202 notifies one or more of the bus units 206 that the intercepted message is valid.

As shown at 114, since there is no match between the calculated propagation timing and the predefined propagation timing, the probe 202 determines that the origin of the intercepted message is invalid.

Moreover, the probe 202 may determine that the intercepted message is invalid in case the probe 202 detects that the associated reflection signal of the intercepted message is invalid. For example, the probe 202 may determine that the intercepted message is invalid in case the probe 202 intercepts multiple reflection signal associated with the intercepted message. In another example, the probe 202 may determine that the intercepted message is invalid in case the probe 202 intercepts a prolonged reflection signal associated with the intercepted message, for example, the prolonged reflection signal exceeds a predefined reflection signal duration threshold.

For most practical deployments of the system 200, it may be significantly difficult for a malicious unit attempting to inject malicious and potentially hazardous data (messages) to the bus units 206 residing on the bus 210, to impersonate a certain legitimate bus unit 206 and connect to the bus 210 at the exact same connection point as the certain legitimate bus unit 206.

Figure 5:
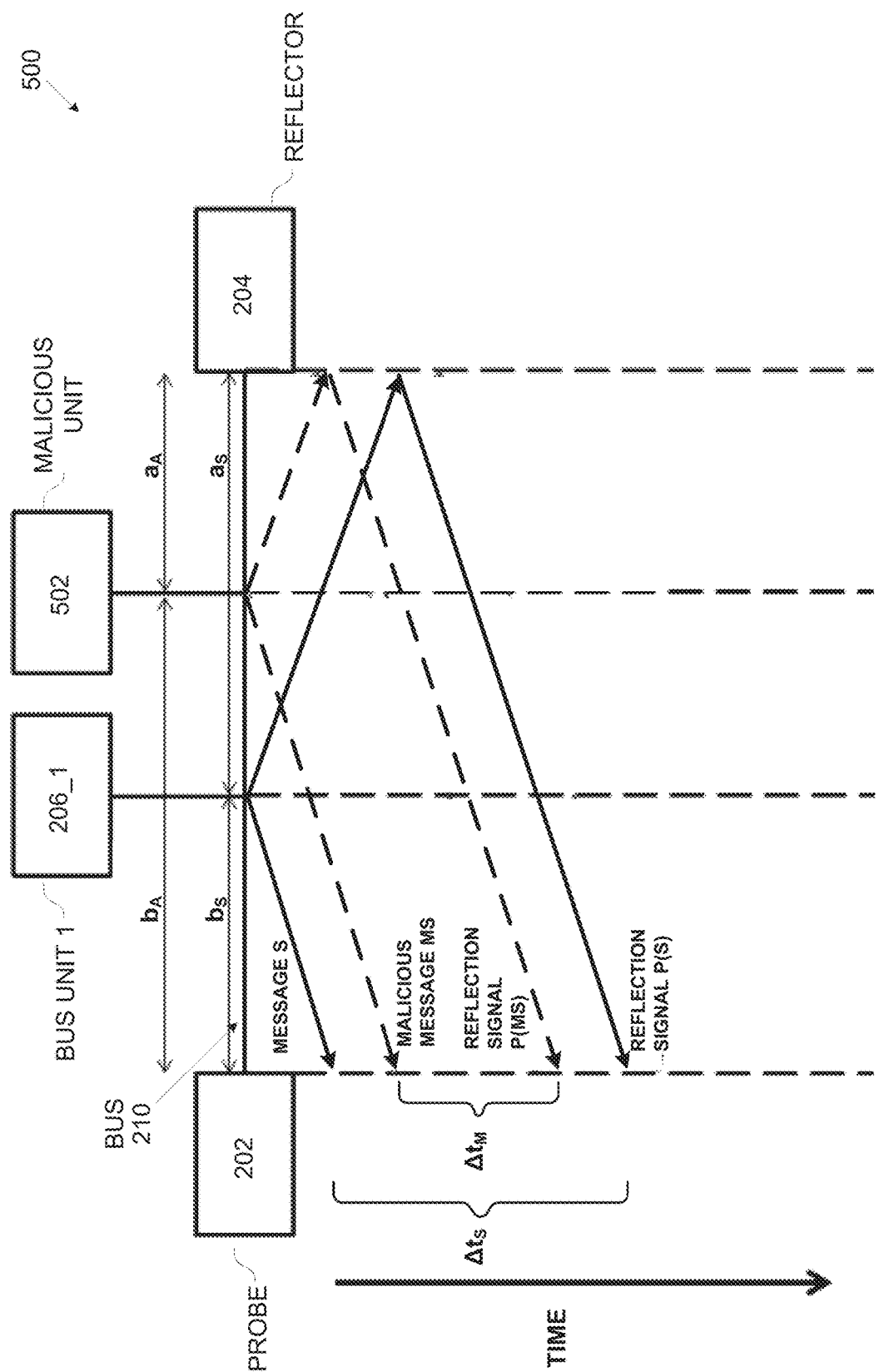
FIG. 5 is a schematic illustration of an exemplary message propagation sequence for detecting an invalid message transmitted by a malicious bus unit, according to some embodiments of the present invention.

Reference is now made to FIG. 5, which is a schematic illustration of an exemplary message propagation sequence for detecting an invalid message transmitted by a malicious bus unit, according to some embodiments of the present invention. Illustration 500 presents an exemplary detection of a malicious message SM transmitted on a bus such as the bus 210 by a malicious unit 502 impersonating as a certain legitimate bus unit 206_1 such as the bus unit 206. As seen in the illustration 500, the malicious unit 502 is able to gain physical access to the bus 210 and connects to the bus 210 at some connection point between a probe such as the probe 202 and a reflector such as the reflector 204. The connection point of the malicious unit 502 to the bus 210 is obviously different than the connection point of the certain bus unit 206_1. The bus unit 206_1 is associated with respective predefined propagation timing $\Delta t_S$ in the TDMT record. The propagation timing $\Delta t_S$ reflects the propagation time between the detection times, at the probe 202, of the message S transmitted by the bus unit 206_1 and of an associated reflection signal P(S) transmitted by the reflector 202 in response to detection of the message S. The malicious unit 502 trying to impersonate as the bus unit 206_1, may transmit the malicious message MS. Moreover, for protocols defining the messages include the originating unit ID such as, for example, the CAN bus, the malicious unit 502 may construct the malicious message MS to include the originating unit ID of the bus unit 206_1. The reflector 204 transmits an associated reflection signal P(MS) in response to the malicious message MS, i.e. following detection of the malicious message MS. The probe 202 intercepts the malicious message MS and the associated reflection signal P(MS) and calculates propagation timing $\Delta t_M$ for the malicious message MS. The probe 202 matches the calculated propagation timing $\Delta t_M$ with the predefined propagation timings assigned to each of the bus units 206. In case the protocol used on the bus 201 defines that the messages include the originating unit ID, the probe 202 may match the calculated propagation timing $\Delta t_M$ to the predefined propagation timing $\Delta t_S$ associated with the originating unit ID of the unit 206_1 used in the malicious message MS. Since the calculated propagation timing $\Delta t_M$ does not match any of the predefined propagation timings (values), and specifically not the predefined propagation timing $\Delta t_S$, the probe 202 may determine that the malicious message MS is invalid and may be sent by a bus unit other than the legitimate bus units 206, specifically other than the bus unit 206_1. In the CAN bus protocol implementation for example, in order to impersonate as the legitimate bus unit 206_1, the malicious unit 502 may encode the malicious message MS with a certain message type exclusively associated with the bus unit 206_1.

As stated herein above, for practical deployments of the system 200, it may be impossible for the malicious unit 502 to connect to bus 210 at the same connection point as the legitimate certain bus unit 206_1. Therefore as part of some attack scenarios and/or attack vectors, the malicious unit 502 may attempt to forge the associated reflection signal P(S) transmitted by the reflector 202 in response to the message S typically transmitted by the certain bus unit 206_1. Forging the associated reflection signal P(S) may include, for example, altering, manipulating, duplicating and/or the like of the associated reflection signal P(S).

Figure 6A:
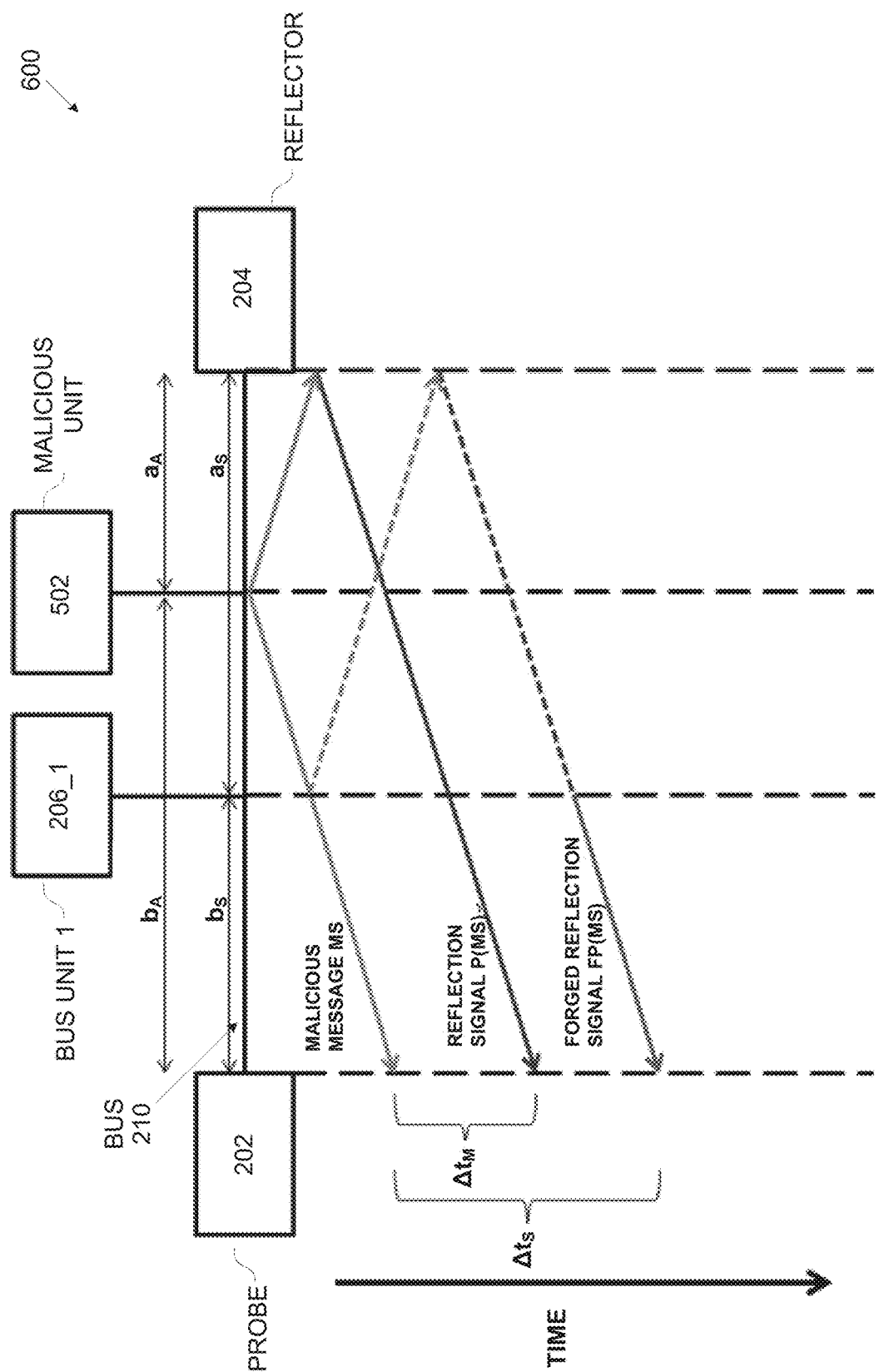
FIG. 6A and FIG. 6B are schematic illustrations of exemplary message propagation sequences for detecting a malicious bus unit forging reflection signals, according to some embodiments of the present invention.
Figure 6B:
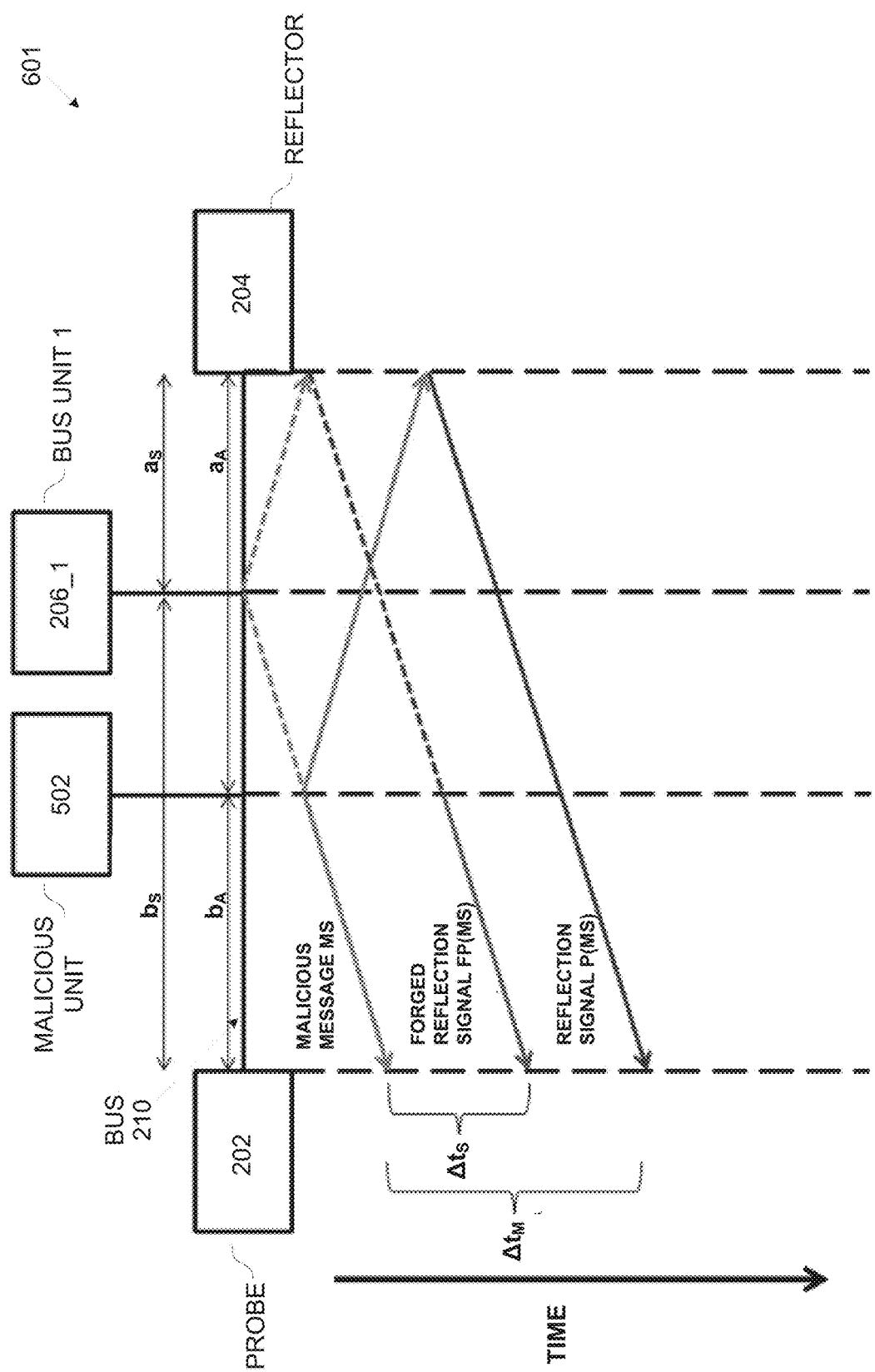

Reference is now made to FIG. 6A and FIG. 6B, which are schematic illustrations of exemplary message propagation sequences for detecting a malicious bus unit forging reflection signals, according to some embodiments of the present invention. Illustration 600 presents an exemplary detection of a malicious message MS transmitted on a bus such as the bus 210 by a malicious unit such as the malicious unit 502 impersonating as a certain legitimate bus unit 206_1 such as the bus unit 206. As seen, the malicious unit 502 is able to gain physical access to the bus 210 and connects to the bus 210 at some connection point between the bus unit 206_1 and a reflector such as the reflector 204. As described herein before, the bus unit 206_1 is associated with respective predefined propagation timing $\Delta t_S$ in the TDMT record. The predefined propagation timing $\Delta t_S$ reflects the propagation time between the detection times, at a probe such as the probe 202, of a message S transmitted by the bus unit 206_1 and of an associated reflection signal P(S) transmitted by the reflector 204 in response to the message S.

The malicious unit 502 trying to impersonate as the bus unit 206_1, may transmit the malicious message MS with the originating unit ID of the bus unit 206_1. The reflector 204 transmits an associated reflection signal P(MS) in response to the malicious message MS, i.e. following detection of the malicious message MS. As can be seen the travel (propagation) time of a signal from the malicious unit 502 to the reflector 204 is designated $a_A$ and the propagation time of a signal from the malicious unit 502 to the probe 202 is designated $b_A$. According to the deployment of the malicious unit 502, the probe 202 may calculate a propagation time $\Delta t_M$ for malicious message MS transmitted by the malicious where $\Delta t_M < \Delta t_S$ since the malicious unit 502 is closer to the reflector 204 than the bus unit 206_1. The malicious unit 502 may try to deceive the probe 202 to calculate the propagation timing $\Delta t_M$ as the propagation timing $\Delta t_S$ which is predefined for the bus unit 206_1. In order to achieve this, the malicious unit 502 may further transmit a forged reflection signal FP(MS) which is constructed according to the propagation timing of messages transmitted by the bus unit 206_1. However, since the malicious unit 502 is unable to prevent the reflector 204 from transmitting the respective reflection signal P(MS), the probe 202 may detect both the associated reflection signal P(MS) and the forged reflection signal FP(MS). The probe 202 may detect the associated reflection signal P(MS) and the forged reflection signal FP(MS) as multiple signals or as a single extended (prolonged) reflection signal. In case of multiple reflection signals detection, the probe 202 may determine that the intercepted malicious message MS is invalid. Also, in case the extended reflection signal associated with the malicious message MS exceeds the predefined reflection signal duration threshold, the probe 202 may determine that the intercepted malicious message MS is invalid.

Illustration 601 presents another exemplary detection sequence of the malicious message MS transmitted on the bus 210 by the malicious unit 502 impersonating as the certain legitimate bus unit 206_1. As seen, in this case the malicious unit 502 which is able to gain physical access to the bus 210 connects to the bus 210 at some connection point between the bus unit 206_1 and the probe 202 such that $\Delta t_M > \Delta t_S$ since the malicious unit 502 is further away from the reflector 204 than the bus unit 206_1. Similarly to the sequence presented for illustration 600, the malicious unit 502 trying to impersonate as the certain bus unit 206_1, transmits the malicious message MS. The reflector 204 transmits the associated reflection signal P(MS) in response to the malicious message MS. The malicious unit 502 further transmits the forged reflection signal FP(MS) which is constructed according to the propagation timing of messages transmitted by the bus unit 206_1. Again, since the malicious unit 502 is unable to prevent the reflector from transmitting the associated reflection signal P(MS), the probe 202 may detect both the associated reflection signal P(MS) and the forged reflection signal FP(MS) as either multiple reflection signals and/or as an extended (prolonged) reflection signal. As described for the previous scenario in illustration 600, in such case the probe 202 may determine the intercepted malicious message MS is invalid.

Reference is made once again to FIG. 1 and FIG. 2.

As shown at 116, the probe 202 may invalidate the intercepted message after determining that the intercepted message is invalid. The probe 202 may invalidate the intercepted message by notifying one or more of the bus units 206 that the intercepted message is invalid. Moreover, the probe 202 may invalidate the intercepted invalid message through one or more actions as defined by the bus protocol implemented on the bus 210. For example, for the CAN bus protocol, the probe 202 may invalidate the intercepted invalid message by broadcasting an error frame consisting of an error flag of 6 consecutive dominant bits and an error delimiter of 8 consecutive recessive bits during the End of Frame (EOF) of the intercepted invalid message.

According to some embodiments of the present invention, the probe 202 and the reflector 204 are integrated in a single device.

Figure 7:
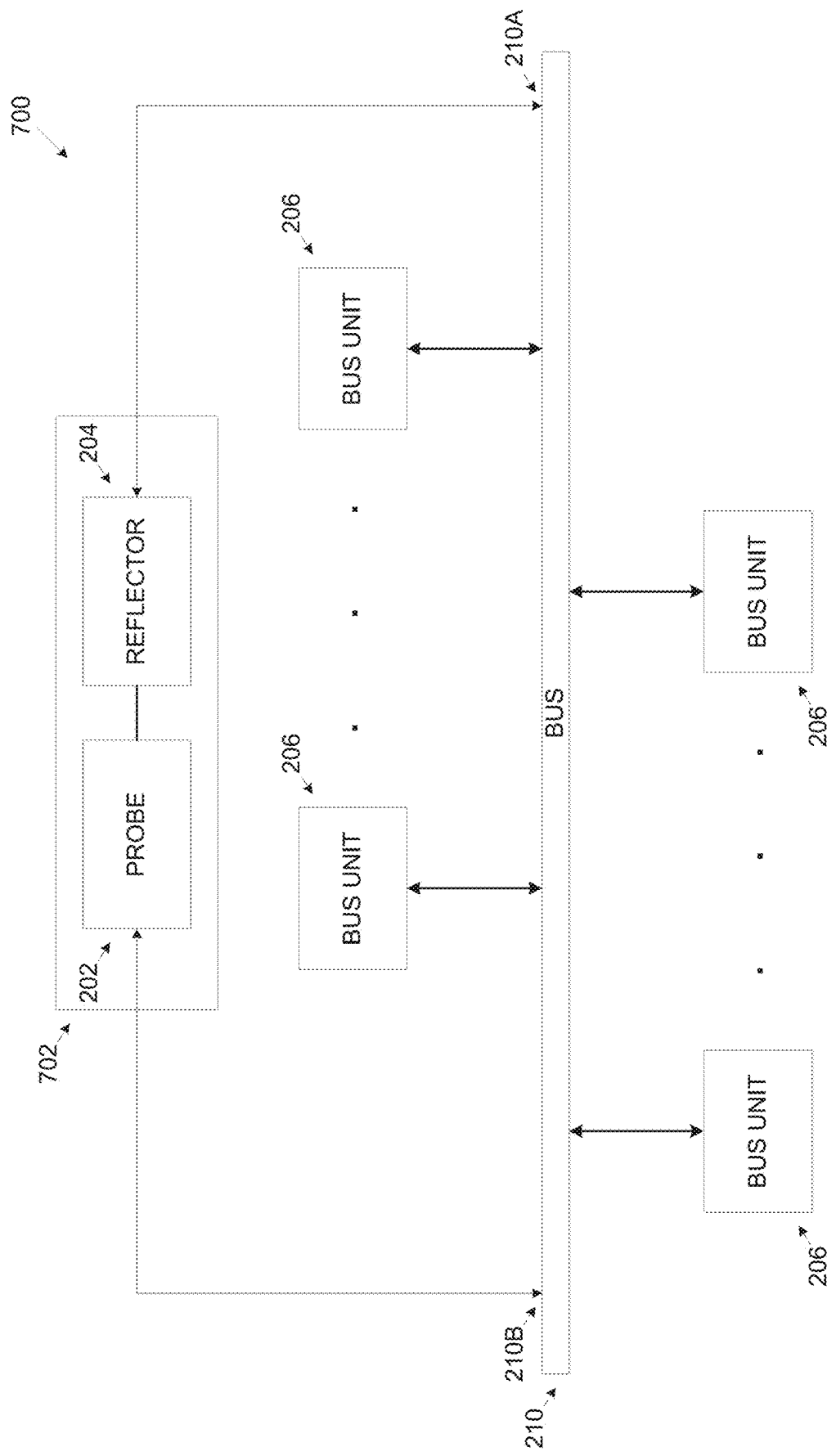
FIG. 7 is a schematic illustration of an exemplary system for authenticating an origin of messages transmitted on a bus using a single device for verification of message prorogation timing on the bus, according to some embodiments of the present invention.

Reference is now made to FIG. 7, which is a schematic illustration of an exemplary system for authenticating an origin of messages transmitted on a bus using a single device for verification of the message prorogation timing on the bus, according to some embodiments of the present invention. An exemplary system 700 for executing a process such as the process 100 includes a device 702 comprising a reflector such as the reflector 204 connected at a first point such as the first point 210A to a bus such as the bus 210 and a probe such as the probe 202 connected to the bus 210 at a second point such as the second point 210B. The probe 202 and the reflector 204 connect to the bus 210 through separate bus interfaces implemented in the device 702. Similarly to the system 200, the bus 210 utilizes line topology and a plurality of bus units such as the bus units 206 are connected to the bus 210 between the first and second points 210A and 210B respectively. The probe 202 and the transmitter 204 perform the process 100 as described herein above. However, due to the fact that the probe 202 and the reflector 204 are integrated in the same device 702, transmitting the reflection signal for each intercepted message may be avoided. Since the probe 202 and the reflector 204 connect to the bus at the external points 210B and 210A respectively, the probe 202 may calculate the propagation timing between the detection time of the intercepted message at the probe 202 and the detection time of the intercepted message at the reflector 204. For example, assuming the signal travel (propagation) time from a certain bus unit 206 to the reflector 204 is $a_S$ and the signal travel time from the certain bus unit 206 to the probe 202 is $b_S$, then the propagation time $\Delta t_S$ for a message S transmitted by the certain bus unit 206 may be expressed as $\Delta t_S = b_S - a_S$. Naturally the propagation time $\Delta t_S$ may be positive or negative depending on the distance of the certain bus unit 206 from the probe 202 and the reflector 204. The propagation time $\Delta t_S$ may therefore be adjusted accordingly. In addition some adjustments may be applied to the mathematical equation to adjust to the single device implementation.

The single device implementation may significantly simplify the design aspects. First deploying the single device 702 may be simpler and cost effective compared to deploying the probe 202 and the reflector 204 separately. Such deployment naturally depends on the topology of the area in which the bus 210 is deployed, for example, the car where the two points 210A and 201B are in close proximity allowing connection of the device 702 to both points 210A and 210B. Moreover, since the reflection signals are not transmitted, the bus communication protocol, for example, the CAN bus protocol may not be altered to insert the reflection signals transparently to the bus units 206 (signal amplitude and/or timing alteration).

According to some embodiments of the present invention, bus 210 may be a segmented bus comprising a plurality of bus segments. Segmenting the bus 210 may be imposed due to wiring and/or deployment constraints. However, segmenting the bus 210 may allow isolating certain bus units 206 from other bus units 206 in order to reduce exposure and improve immunity of the certain bus units 206 to potential security threats which may originate from some bus units 206 that connect to other networks and may be compromised. For example, critical bus units 206 such as the engine control system, the transmission control system, the ABS system and/or the like may be isolated from other bus units 206 such as an infotainment system, the multimedia system, the navigation system and/or the like which may have internet connection and/or cellular connection. Optionally, the probe 202 may serve as a bridge between two or more of the bus segments.

Figure 8:
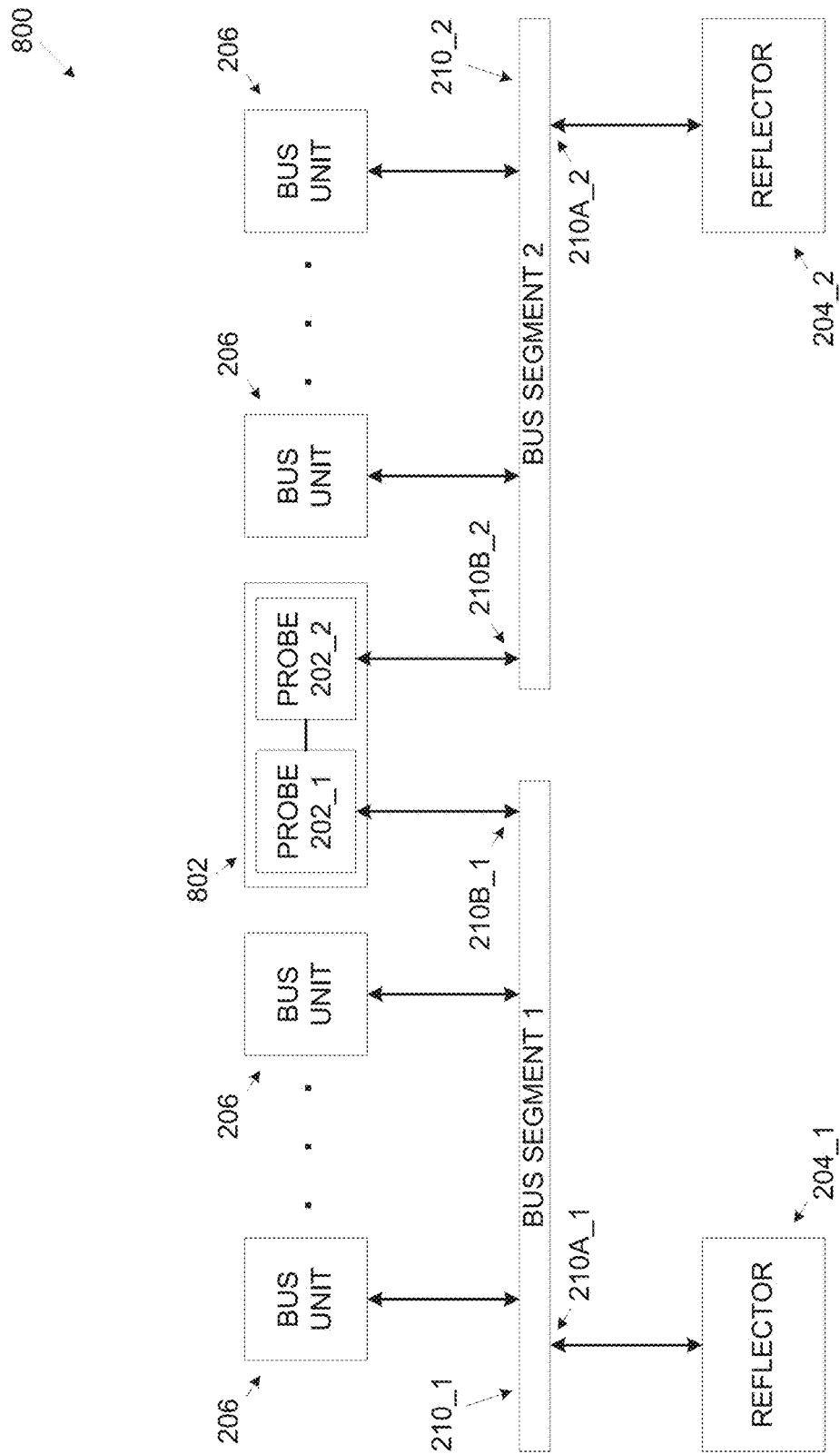
FIG. 8 is a schematic illustration of an exemplary system for authenticating an origin of messages transmitted on a segmented bus based on verification of message prorogation timing on the bus, according to some embodiments of the present invention.

Reference is now made to FIG. 8, which is a schematic illustration of an exemplary system for authenticating an origin of messages transmitted on a segmented bus based on verification of message prorogation timing on the bus, according to some embodiments of the present invention. An exemplary system 800 comprises a bus such as the bus 210 segmented to a plurality of bus segments, for example, a bus segment 210_1 and a bus segment 210_2 each employing line bus topology as the bus 210. Each bus segment includes a reflector such as the reflector 204 connected to the bus 210 at a first point such as the connection point 210A. For example, a reflector 204_1 such as the reflector 204 connects to the bus segment 210_1 at a point 210A_1 and a reflector 204_2 such as the reflector 204 connects to the bus segment 210_2 at a point 210A_2. A unified probe 802 comprises two probes 202_1 and 202_2 such as the probe 202. Each of the two probes 202_1 and 202_2 utilize separate bus interfaces of the unified probe 802 to connect to the bus segments 210_1 and 210_2 respectively at second connection points 210B_1 and 210B_2 respectively such as the second point 210B. A plurality of bus units such as the bus units 206 may be connected to each of the bus segments 210_1 and 210_2. In particular, the bus units 206 connect to the bus segment 210_1 are connected between the first point 210A_1 and the second point 210B_1 and the bus units 206 connect to the bus segment 210_2 are connected between the first point 210A_2 and the second point 210B_2. Each of the probes 202_1 and 202_2 may execute the process 100 similarly for their respective bus segments 210_1 and 201_2 while the reflectors 204_1 and 204_2 may operate similarly to the reflector 204.

Optionally, the unified probe 802 provided an internal connectivity between the probe 202_1 and the probe 202_2 and hence serves as a bridge between the bus segments 210_1 and 210_2 thus allowing authenticated message transfer from the bus segment 210_1 to the bus segment 210_2 and/or vice versa.

It is expected that during the life of a patent maturing from this application many relevant systems, methods and computer programs will be developed and the scope of the terms bus and bus communication protocol are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for authenticating messages transmitted on a bus based on physical location of transmitting units, comprising:

a reflector adapted to inject a plurality of reflection signals at a first point of a line topology bus, each in response to each of a plurality of messages transmitted by a plurality of bus connected units; and a probe adapted to intercept said plurality of messages and said plurality of reflection signals at a second point of said bus, said probe having at least one processor adapted to:

calculate a propagation timing between a reception time of said each message and a reception time of an associated one of said plurality of reflection signals transmitted in response to said each message, and determine validity of said each message according to a match between said calculated propagation timing and each of a plurality of predefined propagation timings associated with said plurality of bus connected units;

wherein said plurality of bus connected units are statically connected to said bus between said first point and said second point;

wherein said plurality of predefined propagation timings is manually set for each of said plurality of bus connected units.

2. A system for authenticating messages transmitted on a bus based on physical location of transmitting units, comprising:

a reflector adapted to inject a plurality of reflection signals at a first point of a line topology bus, each in response to each of a plurality of messages transmitted by a plurality of bus connected units; and a probe adapted to intercept said plurality of messages and said plurality of reflection signals at a second point of said bus, said probe having at least one processor adapted to:

calculate a propagation timing between a reception time of said each message and a reception time of an associated one of said plurality of reflection signals transmitted in response to said each message, and determine validity of said each message according to a match between said calculated propagation timing and each of a plurality of predefined propagation timings associated with said plurality of bus connected units;

wherein said plurality of bus connected units are statically connected to said bus between said first point and said second point;

wherein said predefined propagation timing is dynamically determined by said probe by computing said plurality of predefined propagation timings during an initialization process in which at least one of said plurality of bus connected units transmits at least one unit authentication message used by said probe to calculate a respective one of said plurality of predefined propagation timings.

3. A system for authenticating messages transmitted on a bus based on physical location of transmitting units, comprising:

a reflector adapted to inject a plurality of reflection signals at a first point of a line topology bus, each in response to each of a plurality of messages transmitted by a plurality of bus connected units; and a probe adapted to intercept said plurality of messages and said plurality of reflection signals at a second point of said bus, said probe having at least one processor adapted to:

calculate a propagation timing between a reception time of said each message and a reception time of an associated one of said plurality of reflection signals transmitted in response to said each message, and determine validity of said each message according to a match between said calculated propagation timing and each of a plurality of predefined propagation timings associated with said plurality of bus connected units;

wherein said plurality of bus connected units are statically connected to said bus between said first point and said second point;

wherein said reflector and said probe are integrated in a single device having a plurality of bus interfaces, said reflector connects to said bus through a first bus interface of said plurality of bus interfaces and said probe connects to said bus through a second interface of said plurality of bus interfaces, wherein said propagation timing is calculated between a reception time of said each message at said first bus interface and a reception time of said each message at said second bus interface.

4. The system of claim 3, wherein said calculated propagation timing is indicative of a physical location on said bus of an originating unit of said plurality of bus connected units which transmitted said each message.

5. The system of claim 3, wherein in case of a match, said probe determines said each message is valid and takes no further action, and in case of no match, said probe determines said each message is invalid and invalidates said each message by instructing said plurality of bus connected units to discard said each message.

6. The system of claim 3, wherein said associated reflection signal comprises identification (ID) of said each message to form said association.

7. The system of claim 3, wherein said probe determines said each message is invalid in case at least one additional said associated reflection signal is received for said each message.

8. The system of claim 3, wherein said probe determines said each message is invalid in case a time duration of said associated reflection signal exceeds a predefined reflection signal length threshold.

9. The system of claim 3, wherein said plurality of reflection signals is functionally transparent to said plurality of bus connected units.

10. A system for authenticating messages transmitted on a bus based on physical location of transmitting units, comprising:

a reflector adapted to inject a plurality of reflection signals at a first point of a line topology bus, each in response to each of a plurality of messages transmitted by a plurality of bus connected units; and a probe adapted to intercept said plurality of messages and said plurality of reflection signals at a second point of said bus, said probe having at least one processor adapted to:

calculate a propagation timing between a reception time of said each message and a reception time of an associated one of said plurality of reflection signals transmitted in response to said each message, and determine validity of said each message according to a match between said calculated propagation timing and each of a plurality of predefined propagation timings associated with said plurality of bus connected units;

wherein said plurality of bus connected units are statically connected to said bus between said first point and said second point;

wherein said bus is divided to a plurality of bus segments, each of said plurality of bus segments having a respective said reflector connected to said first point of said each bus segment and a respective said probe connected to said second point of said each bus segment.

11. The system of claim 10, further comprising said respective probe serves as a bridge between at least two of said plurality of bus segments, said respective probe having a plurality of bus interfaces and connects to each of said at least two bus segments through a dedicated one of said plurality of bus interfaces.

12. A system for authenticating messages transmitted on a bus based on physical location of transmitting units, comprising:

a reflector adapted to inject a plurality of reflection signals at a first point of a line topology bus, each in response to each of a plurality of messages transmitted by a plurality of bus connected units; and a probe adapted to intercept said plurality of messages and said plurality of reflection signals at a second point of said bus, said probe having at least one processor adapted to:
- calculate a propagation timing between a reception time of said each message and a reception time of an associated one of said plurality of reflection signals transmitted in response to said each message, and
- determine validity of said each message according to a match between said calculated propagation timing and each of a plurality of predefined propagation timings associated with said plurality of bus connected units;

wherein said plurality of bus connected units are statically connected to said bus between said first point and said second point;

wherein said bus implements a Controller Area Network (CAN) protocol for in which each of said plurality of bus connected units is identified through a respective message type of a plurality of message types encapsulated in said each of said plurality of messages, said respective message type is exclusively associated with said each bus connected unit such that only said each bus connected unit is capable of transmitting said each message of said respective message type.

13. The system of claim 12, further comprising at least one of said plurality of bus connected units is exclusively associated with multiple message types of said plurality of message types.

14. The system of claim 12, wherein in case of a no match said probe determines said each message is invalid and invalidates said invalid message by broadcasting an error flag within an end of frame of said each message.

15. The system of claim 12, wherein said reflector is configured to construct each of said plurality of reflection signals with an altered signal amplitude exceeding an amplitude threshold defined for signals of said plurality of messages such that said each reflection signal is functionally transparent to said plurality of bus connected units.

16. The system of claim 12, wherein said reflector is configured to construct each of said plurality of reflection signals with a different timing than a standard signal of said plurality of messages such that said each reflection signal is functionally transparent to said plurality of other bus connected units.

17. The system of claim 16, wherein said different timing comprising said each reflection signal is asserted between a synchronization segment and a sample point of a first transition from a dominant state of said CAN bus to a recessive state of said CAN bus after detection of transmission of said certain message type in said each message.

18. A computer implemented method of authenticating messages transmitted on a network based on physical location of transmitting units, comprising:

having at least one processor of a probe connected at a second point of a line topology bus, said at least one processor is adapted to:
- intercept a plurality of messages transmitted by a plurality of bus connected units and a plurality of reflection signals injected by a reflector at a first point of said bus, each of said plurality of reflection signals is injected in response to one of said plurality of messages;
- calculate a propagation timing between a reception time of each of said plurality of messages and a reception time of an associated one of said plurality of reflection signals transmitted in response to said each message; and
- determine validity of said each message according to a match between said calculated propagation timing and each of a plurality of predefined propagation timings associated with said plurality of bus connected units;

wherein said plurality of bus connected units are statically connected to said bus between said first point and said second point;

wherein said plurality of predefined propagation timings is manually set for each of said plurality of bus connected units.

* * * * *